United States Patent
Liu et al.

(10) Patent No.: US 12,245,165 B2
(45) Date of Patent: Mar. 4, 2025

(54) COMMUNICATIONS METHOD AND APPARATUS

(71) Applicant: HUAWEI TECHNOLOGIES CO., LTD., Guangdong (CN)

(72) Inventors: Yun Liu, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 17/768,041

(22) PCT Filed: Sep. 10, 2020

(86) PCT No.: PCT/CN2020/114598
§ 371 (c)(1),
(2) Date: Apr. 11, 2022

(87) PCT Pub. No.: WO2021/068708
PCT Pub. Date: Apr. 15, 2021

(65) Prior Publication Data
US 2022/0386247 A1 Dec. 1, 2022

(30) Foreign Application Priority Data
Oct. 12, 2019 (CN) .......................... 201910969472.0

(51) Int. Cl.
*H04W 52/00* (2009.01)
*H04L 5/00* (2006.01)
(Continued)

(52) U.S. Cl.
CPC ......... *H04W 52/325* (2013.01); *H04L 5/0051* (2013.01); *H04W 92/18* (2013.01)

(58) Field of Classification Search
CPC ..... H04L 5/001; H04L 5/0044; H04L 5/0051; H04L 5/0055; H04W 52/225;
(Continued)

(56) References Cited

U.S. PATENT DOCUMENTS 11,764,907 B2 * 9/2023 Kotaba ................. H04L 1/1887
370/329
11,765,690 B2 * 9/2023 Huang .............. H04W 72/0446
370/329
(Continued)

FOREIGN PATENT DOCUMENTS

CN 104284439 A 1/2015
WO 2019041261 A1 3/2019

OTHER PUBLICATIONS

R1-1910516, Nokia et al, Discussion of In-device coexistence between LTE and NR sidelinks, 3GPP TSG RAN WG1 Meeting #98bis Chongqing, China, Aug. 14-20, 2019, total 2 pages.
(Continued)

*Primary Examiner* — Md K Talukder

(57) ABSTRACT

This application provides a communications method and apparatus. According to the method, a receiving terminal receives, from one or more sending terminals, X PSSCHs that are in a one-to-one correspondence with X PSFCH resources, determines M PSFCH resources based on priorities of the X PSFCH resources, transmit power corresponding to the X PSFCH resources, and total transmit power of the receiving terminal, and sends feedback information to some or all of the one or more sending terminals on the M PSFCH resources, so that the receiving terminal can send the M PSFCH resources based on a sending capability (namely, the total transmit power) of the receiving terminal. This improves overall performance of a network system.

18 Claims, 6 Drawing Sheets

(51) Int. Cl.
*H04W 52/32* (2009.01)
*H04W 92/18* (2009.01)

(58) Field of Classification Search
CPC ............. H04W 52/325; H04W 52/367; H04W 52/383; H04W 72/56; H04W 92/18
USPC ........................................................ 455/522
See application file for complete search history.

(56) References Cited

U.S. PATENT DOCUMENTS

| | | | |
|---|---|---|---|
| 2018/0006783 A1 | 1/2018 | Zhu et al. | |
| 2019/0191446 A1 | 6/2019 | Liu et al. | |
| 2020/0220694 A1* | 7/2020 | Khoryaev | H04W 28/04 |
| 2021/0105661 A1* | 4/2021 | Baghel | H04W 4/70 |
| 2021/0391951 A1* | 12/2021 | Lee | H04W 4/08 |
| 2022/0046628 A1* | 2/2022 | Ji | H04L 5/0094 |
| 2022/0078782 A1* | 3/2022 | Zhao | H04W 72/0446 |
| 2022/0085923 A1* | 3/2022 | Ye | H04L 1/1825 |
| 2022/0321308 A1* | 10/2022 | Yu | H04L 1/1812 |
| 2022/0330278 A1* | 10/2022 | Hong | H04W 92/18 |
| 2022/0386247 A1* | 12/2022 | Liu | H04L 5/0051 |
| 2022/0394738 A1* | 12/2022 | Yang | H04L 1/1864 |
| 2022/0400484 A1* | 12/2022 | Lee | H04W 72/02 |
| 2023/0079376 A1* | 3/2023 | Wang | H02J 7/00034 455/73 |

OTHER PUBLICATIONS

R1-1910217, vivo, Physical layer procedure for NR sidelink, 3GPP TSG RAN WG1 Meeting #98bis, Chongqing, China, Oct. 14-20, 2019, 24 pages.
3GPP TS 38.101-1 V15.7.0 (Sep. 2019), 3rd Generation Partnership Project; Technical Specification Group Radio Access Network; NR;User Equipment (UE) radio transmission and reception;Part 1: Range 1 Standalone(Release 15), 234 pages.
R1-1911023, ASUSTeK, Discussion on sidelink physical layer procedure on NR V2X, 3GPP TSG RAN WG1 #98bis, Chongqing, China, Oct. 14-20, 2019, 11 pages.
3GPP TS 38.213 V15.7.0 (Sep. 2019), 3rd Generation Partnership Project; Technical Specification Group Radio Access Network; NR;Physical layer procedures for control(Release 15), 108 pages.
R1-1910783, LG Electronics, Discussion on physical layer procedures for NR sidelink, 3GPP TSG RAN WG1 Meeting #98bis, Chongqing, China, Oct. 14-20, 2019, 23 pages.
R1-1907018, LG Electronics, Discussion on physical layer procedures for NR sidelink, 3GPP TSG RAN WG1 Meeting #97, Reno, USA, May 13-17, 2019, 11 pages.
R1-1908364, OPPO, Physical layer procedure for NR-V2X sidelink, 3GPP TSG RAN WG1 #98, Prague, CZ, Aug. 26-30, 2019, 13 pages.
R1-1908584, CATT, Sidelink physical layer procedures in NR V2X, 3GPP TSG RAN WG1 Meeting #98, Prague, CZ, Aug. 26-30, 2019, 9 pages.
R1-1908906, LG Electronics, 3GPP TSG RAN WG1 Meeting #98, Prague, CZ, Aug. 26-30, 2019, 19 pages.
R1-1909032, InterDigital, Inc., Physical Layer Procedures for NR V2X Sidelink, 3GPP TSG RAN WG1 #98, Prague, CZ, Aug. 26-30, 2019, 13 pages.
R1-1909190, NTT DOCOMO, Inc., Sidelink physical layer procedure for NR V2X, 3GPP TSG RAN WG1 #98, Prague, CZ, Aug. 26-30, 2019, 13 pages.
R1-1909257, Qualcomm Incorporated, Physical layer procedures for sidelink, 3GPP TSG RAN WG1 #98, Prague, CZ, Aug. 26-30, 2019, 19 pages.
R1-1909294, Xiaomi Communications, on Procedures for 5G V2x communications, 3GPP TSG RAN WG1 #98, Prague, CZ, Aug. 26-30, 2019, 5 pages.

* cited by examiner

COMMUNICATIONS METHOD AND APPARATUS

CROSS-REFERENCE TO RELATED APPLICATIONS

This application is a national stage of International Application No. PCT/CN2020/114598, filed on Sep. 10, 2020, which claims priority to Chinese Patent Application No. 201910969472.0, filed on Oct. 12, 2019. Both of the aforementioned applications are hereby incorporated by reference in their entireties.

TECHNICAL FIELD

This application relates to the field of communications technologies, and in particular, to a communications method and apparatus.

BACKGROUND

Vehicle to everything (V2X) is a key technology of an intelligent transportation system, and is considered to be one of the fields that have the largest industry potential and clearest market requirements in an internet of things system. The vehicle to everything usually refers to a communications network that uses vehicle information provided by a sensor, a vehicle-mounted terminal, and the like that are mounted on a vehicle, to implement vehicle to vehicle (V2V), vehicle to infrastructure (V2I), vehicle to network (V2N), and vehicle to pedestrian (V2P) communication.

The V2X features wide application space, great industry potential, and high social benefits. The V2X is of great significance to promote innovative development of the automobile and information communications industry, build a new model and a new service for automobile and transportation services, promote innovation and application of technologies such as unmanned driving, assisted driving, intelligent driving, connected driving, intelligent connected driving, automated driving, and car sharing, and improve traffic efficiency and a safety level.

In a new radio (NR) V2X scenario, after a sending terminal sends data to a receiving terminal by using a subchannel, the receiving terminal needs to perform hybrid automatic repeat request (HARQ) feedback to the sending terminal. The HARQ feedback is an acknowledgement (ACK) or a negative acknowledgement (NACK). The ACK indicates that the receiving terminal correctly receives the data, and the NACK indicates that the receiving terminal does not correctly receive the data.

The HARQ feedback is carried on a physical sidelink feedback channel (PSFCH). If one or more sending terminals send a plurality of physical sidelink shared channels (PSSCH) to one receiving terminal, the receiving terminal needs to perform HARQ feedback for each PSSCH. However, transmit power of the receiving terminal may not support simultaneous HARQ feedbacks for all PSSCHs. In this case, according to a current specification in the standard, the receiving terminal may select M' PSFCH resources based on priorities, to simultaneously perform HARQ feedback for some PSSCHs in the plurality of PSSCHs. However, a manner of selecting the M' PSFCH resources is not provided, and each selection manner has advantages and disadvantages. Therefore, overall performance of a communications system may be further affected.

SUMMARY

Embodiments of this application provide a communications method and apparatus, to ensure overall performance of a communications system.

To achieve the foregoing objective, this application provides the following technical solutions.

According to a first aspect, a communications method is provided, including: A receiving terminal receives from one or more sending terminals, X PSSCHs that are in a one-to-one correspondence with X PSFCH resources, determines M PSFCH resources based on priorities of the X PSFCH resources, transmit power corresponding to the X PSFCH resources and total transmit power of the receiving terminal, and then sends feedback information to some or all of the one or more sending terminals on the M PSFCH resources. The X PSFCH resources have a same time domain resource, X is an integer greater than 1, M is less than or equal to M', and M' is an upper limit of a quantity of PSFCH resources occupied on a same time domain resource. According to the method provided in the first aspect, the receiving terminal may determine the M PSFCH resources based on priorities of the PSFCH resources, transmit power corresponding to the PSFCH resources, and total transmit power of the receiving terminal, to send the M PSFCH resources based on a sending capability (namely, the total transmit power) of the receiving terminal. This improves overall performance of a network system.

In a possible implementation, that the receiving terminal determines M PSFCH resources based on priorities of the X PSFCH resources, transmit power corresponding to the X PSFCH resources, and total transmit power of the receiving terminal includes: The receiving terminal accumulates, in descending order of the priorities of the X PSFCH resources, transmit power corresponding to PSFCH resources; and when an accumulation result of accumulating transmit power corresponding to m PSFCH resources is less than or equal to the total transmit power, and m is equal to M', or when an accumulation result of accumulating transmit power corresponding to m PSFCH resources is equal to the total transmit power, and m is less than M', the receiving terminal determines that the m PSFCH resources are the M PSFCH resources. In this possible implementation, it can be ensured that the M PSFCH resources are sent within the sending capability of the receiving terminal (namely, within the total transmit power of the receiving terminal). In addition, it can be ensured that the quantity of the determined M PSFCH resources is less than or equal to the upper limit of the quantity of PSFCH resources occupied on the same time domain resource. This improves overall performance of a network system.

In a possible implementation, that the receiving terminal determines M PSFCH resources based on priorities of the X PSFCH resources, transmit power corresponding to the X PSFCH resources, and total transmit power of the receiving terminal includes: The receiving terminal accumulates, in descending order of the priorities of the X PSFCH resources, transmit power corresponding to PSFCH resources; and when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal determines that the m PSFCH resources are the M PSFCH resources. In this possible implementation, it can be ensured that the M PSFCH resources are sent within the sending capability of the receiving terminal (namely, within the total transmit power of the receiving terminal). In addition, it can be ensured that the quantity of the determined M PSFCH resources is less than or equal to the upper limit of the quantity of PSFCH resources occupied on the same time domain resource. This improves overall performance of a network system.

In a possible implementation, that the receiving terminal determines M PSFCH resources based on priorities of the X PSFCH resources, transmit power corresponding to the X PSFCH resources, and total transmit power of the receiving terminal includes: The receiving terminal accumulates, in descending order of the priorities of the X PSFCH resources, the transmit power corresponding to the PSFCH resources; when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal reduces transmit power corresponding to an $(m+1)^{th}$ PSFCH resource in the m+1 PSFCH resources, so that the accumulation result of accumulating the transmit power corresponding to the m+1 PSFCH resources is less than or equal to the total transmit power; and the receiving terminal determines that the m+1 PSFCH resources are the M PSFCH resources. In this possible implementation, it can be ensured that the M PSFCH resources are sent within the sending capability of the receiving terminal (namely, within the total transmit power of the receiving terminal). In addition, it can be ensured that the quantity of the determined M PSFCH resources is less than or equal to the upper limit of the quantity of PSFCH resources occupied on the same time domain resource. This improves overall performance of a network system.

In a possible implementation, that the receiving terminal determines M PSFCH resources based on priorities of the X PSFCH resources, transmit power corresponding to the X PSFCH resources, and total transmit power of the receiving terminal includes: The receiving terminal accumulates, in descending order of the priorities of the X PSFCH resources, transmit power corresponding to PSFCH resources; when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal reduces transmit power corresponding to a PSFCH resource with a first priority in the m+1 PSFCH resources, so that the accumulation result of accumulating the transmit power corresponding to the m+1 PSFCH resources is less than or equal to the total transmit power, where the first priority is a priority of an $(m+1)^{th}$ PSFCH resource in the m+1 PSFCH resources; and the receiving terminal determines that the m+1 PSFCH resources are the M PSFCH resources. In this possible implementation, it can be ensured that the M PSFCH resources are sent within the sending capability of the receiving terminal (namely, within the total transmit power of the receiving terminal). In addition, it can be ensured that the quantity of the determined M PSFCH resources is less than or equal to the upper limit of the quantity of PSFCH resources occupied on the same time domain resource. This improves overall performance of a network system.

In a possible implementation, that the receiving terminal determines M PSFCH resources based on priorities of the X PSFCH resources, transmit power corresponding to the X PSFCH resources, and total transmit power of the receiving terminal includes: The receiving terminal accumulates, in descending order of the priorities of the X PSFCH resources, transmit power corresponding to PSFCH resources; when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal reduces transmit power corresponding to x1 PSFCH resources with a first priority, so that an accumulation result of accumulating transmit power corresponding to m+1−x2+x1 PSFCH resources is less than or equal to the total transmit power, where the first priority is a priority of an $(m+1)^{th}$ PSFCH resource in the m+1 PSFCH resources, x2 is a quantity of PSFCH resources with the first priority in the m+1 PSFCH resources, x1=min(x3, M'−(m+1−x2)), min is a minimum value function, and x3 is a quantity of PSFCH resources with the first priority; and the receiving terminal determines that the m+1−x2+x1 PSFCH resources are the M PSFCH resources. In this possible implementation, it can be ensured that the M PSFCH resources are sent within the sending capability of the receiving terminal (namely, within the total transmit power of the receiving terminal). In addition, it can be ensured that the quantity of the determined M PSFCH resources is less than or equal to the upper limit of the quantity of PSFCH resources occupied on the same time domain resource. This improves overall performance of a network system.

In a possible implementation, that the receiving terminal determines M PSFCH resources based on priorities of the X PSFCH resources, transmit power corresponding to the X PSFCH resources, and total transmit power of the receiving terminal includes: The receiving terminal accumulates, in descending order of the priorities of the X PSFCH resources, the transmit power corresponding to the PSFCH resources; when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal determines a first combination from a plurality of combinations, where the plurality of combinations are combinations of PSFCH resources with a first priority, and the first priority is a priority of an $(m+1)^{th}$ PSFCH resource in the m+1 PSFCH resources; and the receiving terminal determines that m+1−x2+x3 accumulated PSFCH resources are the M PSFCH resources, where x2 is a quantity of PSFCH resources with the first priority in the m+1 PSFCH resources, and x3 is a quantity of PSFCH resources in the first combination. Compared with another combination, the first combination meets the following features: a sum of the quantity of PSFCH resources in the first combination and a quantity of all PSFCH resources with priorities higher than the first priority is less than or equal to M', a sum of transmit power corresponding to the PSFCH resources in the first combination and transmit power corresponding to all the PSFCH resources with the priorities higher than the first priority is less than or equal to the total transmit power, and the sum of the quantity of PSFCH resources in the first combination and the quantity of all PSFCH resources with the priorities higher than the first priority is a maximum. In this possible implementation, it can be ensured that the M PSFCH resources are sent within the sending capability of the receiving terminal (namely, within the total transmit power of the receiving terminal). In addition, it can be ensured that the quantity of the determined M PSFCH resources is less than or equal to the upper limit of the quantity of PSFCH resources occupied on the same time domain resource, so that the quantity of the determined M PSFCH resources is the maximum. This improves overall performance of a network system.

In a possible implementation, compared with the another combination, the first combination further meets the following feature: The sum of the transmit power corresponding to the PSFCH resources in the first combination and the transmit power corresponding to all the PSFCH resources with the priorities higher than the first priority is a minimum, or a difference between the total transmit power and the sum of the transmit power corresponding to the PSFCH resources in the first combination and the transmit power corresponding to all the PSFCH resources with the priorities higher than the first priority is a maximum. In this possible implementation, it can be ensured that the M PSFCH resources are sent within the sending capability of the receiving terminal (namely, within the total transmit power of the receiving terminal). In addition, it can be ensured that the quantity of the determined M PSFCH resources is less than or equal to the upper limit of the quantity of PSFCH resources occupied on the same time domain resource, so that the quantity of the determined M PSFCH resources is the minimum. This improves overall performance of a network system.

According to a second aspect, a communications apparatus is provided, including a communications unit and a processing unit. The communications unit is configured to receive, from at least one sending terminal, X PSSCHs that are in a one-to-one correspondence with X PSFCH resources, where X PSFCH resources corresponding to the X PSSCHs have a same time domain resource, and X is an integer greater than 1. The processing unit is configured to determine M PSFCH resources based on priorities of the X PSFCH resources, transmit power corresponding to the X PSFCH resources, and total transmit power of the apparatus, where M is less than or equal to M', and M' is an upper limit of a quantity of PSFCH resources occupied on the same time domain resource. The communications unit is further configured to send feedback information to some or all of the at least one sending terminal on the M PSFCH resources.

In a possible implementation, the processing unit is specifically configured to: accumulate, in descending order of the priorities of the X PSFCH resources, the transmit power corresponding to the PSFCH resources; and when an accumulation result of accumulating transmit power corresponding to m PSFCH resources is less than or equal to the total transmit power, and m is equal to M', or when an accumulation result of accumulating transmit power corresponding to m PSFCH resources is equal to the total transmit power, and m is less than M', determine that the m PSFCH resources are the M PSFCH resources.

In a possible implementation, the processing unit is specifically configured to: accumulate, in descending order of the priorities of the X PSFCH resources, the transmit power corresponding to the PSFCH resources; and when an accumulation result of accumulating transmit power corresponding to m PSFCH resources is less than or equal to the total transmit power, and when an accumulation result of accumulating transmit power corresponding to m+1 PSFCH resources is greater than the total transmit power, and m+1 is less than or equal to M', determine that the m PSFCH resources are the M PSFCH resources.

In a possible implementation, the processing unit is specifically configured to: accumulate, in descending order of the priorities of the X PSFCH resources, the transmit power corresponding to the PSFCH resources; when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', reduce transmit power corresponding to an $(m+1)^{th}$ PSFCH resource in the m+1 PSFCH resources, so that the accumulation result of accumulating the transmit power corresponding to the m+1 PSFCH resources is less than or equal to the total transmit power; and determine that the m+1 PSFCH resources are the M PSFCH resources.

In a possible implementation, the processing unit is specifically configured to: accumulate, in descending order of the priorities of the X PSFCH resources, transmit power corresponding to PSFCH resources; when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', reduce transmit power corresponding to a PSFCH resource with a first priority in the m+1 PSFCH resources, so that the accumulation result of accumulating the transmit power corresponding to the m+1 PSFCH resources is less than or equal to the total transmit power, where the first priority is a priority of an $(m+1)^{th}$ PSFCH resource in the m+1 PSFCH resources; and determine that the m+1 PSFCH resources are the M PSFCH resources.

In a possible implementation, the processing unit is specifically configured to: accumulate, in descending order of the priorities of the X PSFCH resources, transmit power corresponding to PSFCH resources; when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', reduce transmit power corresponding to x1 PSFCH resources with a first priority, so that an accumulation result of accumulating transmit power corresponding to m+1−x2+x1 PSFCH resources is less than or equal to the total transmit power, where the first priority is a priority of an $(m+1)^{th}$ PSFCH resource in the m+1 PSFCH resources, x2 is a quantity of PSFCH resources with the first priority in the m+1 PSFCH resources, x1=min(x3, M'−(m+1−x2)), min is a minimum value function, and x3 is a quantity of PSFCH resources with the first priority; and determine that the m+1−x2+x1 PSFCH resources are the M PSFCH resources.

In a possible implementation, the processing unit is specifically configured to: accumulate, in descending order of the priorities of the X PSFCH resources, transmit power corresponding to PSFCH resources; when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', determine a first combination from a plurality of combinations, where the plurality of combinations are combinations of PSFCH resources with a first priority, and the first priority is a priority of an $(m+1)^{th}$ PSFCH resource in the m+1 PSFCH resources; and determine that m+1−x2+x3 accumulated PSFCH resources are the M PSFCH resources, where x2 is a quantity of PSFCH resources with the first priority in the m+1 PSFCH resources, and x3 is a quantity of PSFCH resources in the first combination. Compared with another combination, the first combination meets the following features: a sum of the quantity of PSFCH resources in the first combination and a quantity of all PSFCH resources with priorities higher than the first priority is less than or equal to M', a sum of transmit power corresponding to the PSFCH resources in the first combination and transmit power corresponding to all the PSFCH resources with the priorities higher than the first priority is less than or equal to the total transmit power, and the sum of the quantity of PSFCH resources in the first combination and the quantity of all PSFCH resources with the priorities higher than the first priority is a maximum.

In a possible implementation, compared with the another combination, the first combination further meets the following feature: The sum of the transmit power corresponding to the PSFCH resources in the first combination and the transmit power corresponding to all the PSFCH resources with the priorities higher than the first priority is a minimum, or a difference between the total transmit power and the sum of the transmit power corresponding to the PSFCH resources in the first combination and the transmit power corresponding to all the PSFCH resources with the priorities higher than the first priority is a maximum.

According to a third aspect, a communications apparatus is provided, including a processor. The processor is connected to the memory, the memory is configured to store computer-executable instructions, and the processor executes the computer-executable instructions stored in the memory, to implement any method provided in the first aspect. The memory and the processor may be integrated together, or may be independent devices. If the memory and the processor may be independent devices, the memory may be located inside the communications apparatus, or may be located outside the communications apparatus.

In a possible implementation, the processor includes a logic circuit and at least one of an input interface and an output interface. The output interface is configured to perform a sending action in a corresponding method, and the input interface is configured to perform a receiving action in a corresponding method.

In a possible implementation, the communications apparatus further includes a communications interface and a communications bus. The processor, the memory, and the communications interface are connected by using the communications bus. The communications interface is configured to perform a receiving and sending action in a corresponding method. The communications interface may also be referred to as a transceiver. Optionally, the communications interface includes at least one of a transmitter or a receiver. In this case, the transmitter is configured to perform a sending action in a corresponding method, and the receiver is configured to perform a receiving action in a corresponding method.

In a possible implementation, the communications apparatus exists in a product form of a chip.

According to a fourth aspect, a computer-readable storage medium is provided, including instructions. When the instructions are run on a computer, the computer is enabled to perform any method provided in the first aspect.

According to a fifth aspect, a computer program product including instructions is provided. When the instructions are run on a computer, the computer is enabled to perform any method provided in the first aspect.

For technical effects brought by any implementation of the second to the fifth aspects, refer to technical effects brought by the implementations of the first aspect. Details are not described herein.

DESCRIPTION OF EMBODIMENTS

In the descriptions of this application, unless otherwise specified, "/" means "or". For example, A/B may represent A or B. The term "and/or" in this specification describes only an association relationship for associated objects and represents that three relationships may exist. For example, A and/or B may represent the following three cases: Only A exists, both A and B exist, and only B exists. In addition, "at least one" refers to one or more, and "a plurality of" refers to two or more. Words such as "first" and "second" do not limit a quantity and an execution sequence, and the words such as "first" and "second" do not indicate a definite difference.

It should be noted that, in this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a relative concept in a specific manner.

Figure 1:
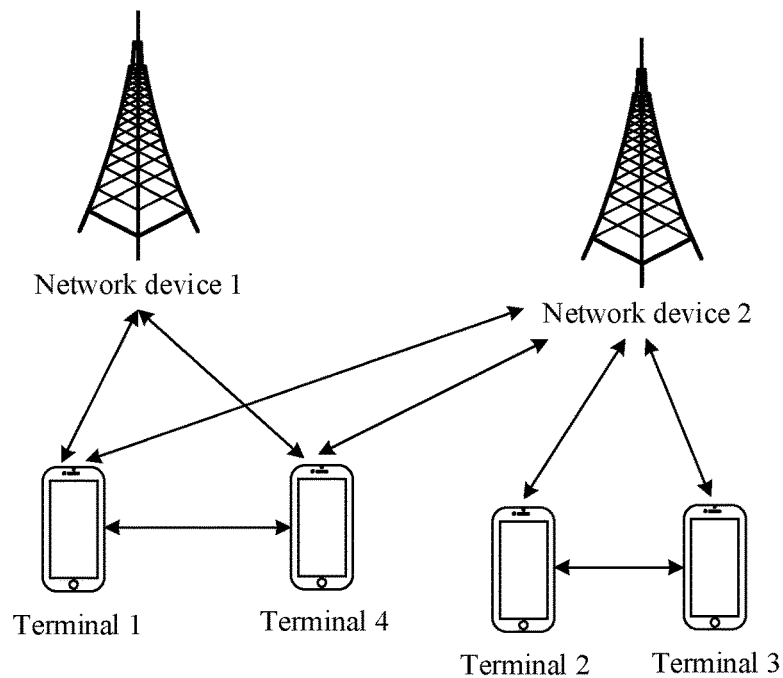
FIG. 1 is a schematic diagram of a system architecture according to an embodiment of this application.

Network elements in this application include a network device and a terminal in a communications system. Referring to FIG. 1, a method provided in an embodiment of this application mainly relates to communication between terminals, and communication between a terminal and a network device.

The communications system in the embodiments of this application includes but is not limited to a long term evolution (LTE) system, a fifth generation (5G) system, an NR system, a wireless local area network (WLAN) system, a future evolution system, or a plurality of communications convergence systems. The 5G system may be a non-standalone (NSA) 5G system or a standalone (SA) 5G system.

The network device in this embodiment of this application is an entity that is on a network side and that is configured to send a signal or receive a signal, or send a signal and receive a signal. The network device may be an apparatus that is deployed in a radio access network (RAN) and that provides a wireless communication function for the terminal, for example, may be a transmission reception point (TRP), a base station, various forms of control nodes (for example, a network controller, a radio controller (for example, a radio controller in a cloud radio access network (CRAN) scenario)), or the like. Specifically, the network device may be various forms of a macro base station, a micro base station (also referred to as a small cell), a relay station, an access point (AP), or the like, or may be an antenna panel of a base station. The control node may be connected to a plurality of base stations, and configure resources for a plurality of terminals covered by the plurality of base stations. In systems using different radio access technologies, names of devices having base station functions may be different. For example, a base station in an LTE system may be referred to as an evolved NodeB (eNB, or eNodeB), and a base station in a 5G system or an NR system may be referred to as a next generation NodeB (gNB). A specific name of the base station is not limited in this application. The network device may alternatively be a network device in a future evolved public land mobile network (PLMN) or the like.

The terminal in this embodiment of this application is an entity that is on a user side and that is configured to receive a signal or send a signal, or receive a signal and send a signal. The terminal is configured to provide a user with one or more of a voice service and a data connectivity service. Alternatively, the terminal may be referred to as user equipment (UE), a terminal device, an access terminal, a subscriber unit, a subscriber station, a mobile station, a remote station, a remote terminal, a mobile device, a user terminal, a wireless communications device, a user agent, or a user apparatus. The terminal may be a V2X device, for example, a smart car (smart car or intelligent car), a digital car, an unmanned car (unmanned car, driverless car, pilotless car, or automobile), an automatic car (self-driving car or autonomous car), a pure electric vehicle (pure EV or Battery EV), a hybrid electric vehicle (HEV), a range extended electric vehicle (range extended EV, REEV), a plug-in hybrid electric vehicle (plug-in HEV, PHEV), a new energy vehicle, or a road site unit (RSU). Alternatively, the terminal may be a D2D device, for example, an electricity meter or a water meter. Alternatively, the terminal may be a mobile station (MS), a subscriber unit, an unmanned aerial vehicle, an internet of things (IoT) device, a station (ST) in a WLAN, a cellular phone, a smart phone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device with a wireless communication function, a computing device or another processing device connected to a wireless modem, a vehicle-mounted device, or a wearable device (which may also be referred to as a wearable intelligent device). Alternatively, the terminal may be a terminal in a next generation communications system, for example, a terminal in a 5G system, a terminal in a future evolved PLMN, or a terminal in an NR system.

The method provided in the embodiments of this application may be applicable to but is not limited to the following fields: device to device (D2D), V2X, unmanned driving, automated driving (ADS), driver assistance (ADAS), intelligent driving, connected driving, intelligent network driving, car sharing, and the like.

In the NR system, a V2X architecture is classified into standalone deployment and multi-RAT dual connectivity (MR-DC) deployment. In an independent deployment scenario, two terminals (for example, a terminal 2 and a terminal 3 in FIG. 1) that perform V2X communication access a same network device, and the network device perform management and configuration on the two terminals. For example, the network device may be the gNB, a next-generation eNB (ng-eNB), the eNB, or the like. In a multi-RAT dual connectivity deployment scenario, two terminals that perform V2X communication both access a master node (MN) and a secondary node (SN) For example, both a terminal 1 and the terminal 4 in FIG. 1 access the network device 1 and the network device 2. One of the network device 1 and the network device 2 is the master node, and the other is the secondary node. The master node may perform management and configuration on the terminals that perform V2X communication.

In a V2X scenario and another communication scenario, a communication link on which direct communication is performed between terminals may be referred to as a sidelink (sidelink, SL). On the SL, a sending terminal may directly send data to a receiving terminal, and does not need to first send the data to the network device, and then forward the data to the receiving terminal through a core network. This can greatly reduce a data transmission delay.

To make the embodiments of this application clearer, the following briefly describes concepts and some content related to the embodiments of this application.

1. SL HARQ Feedback

The SL HARQ combines forward error correction (FEC) and an automatic repeat request (ARQ). After redundant information is added, the FEC enables the receiving terminal to correct some errors, to reduce a number of retransmission times. For an error that cannot be corrected by the FEC, the receiving terminal requests, by using an ARQ mechanism, the sending terminal to retransmit the data. The receiving terminal uses an error detection code, for example, a cyclic redundancy check (CRC), to detect whether an error occurs in received data. If no error occurs, the receiving terminal sends an ACK to the sending terminal. After receiving the ACK, the sending terminal sends next data. If an error occurs, the receiving terminal sends a NACK to the sending terminal, and after receiving the NACK, the sending terminal retransmits the data. The ACK and the NACK are the HARQ feedback.

In the ARQ mechanism described above, after the receiving terminal receives a data packet, if a decoding error occurs, the receiving terminal discards the data packet and requests retransmission. The data packet that encounters the decoding error includes useful information. If the data packet is discarded, the useful information is lost. After the HARQ with soft combining is used, the data packet that encounters the decoding error is stored in a HARQ buffer, and is soft-combined with a retransmitted data packet subsequently received. Then decoding is performed. Similarly, if the decoding still fails, the foregoing process may continue to be repeated. Newly received retransmitted data is combined with data in the buffer, and decoding is performed again. Compared with separate decoding (to be specific, data transmitted each time is separately decoded and is not combined with previous data for decoding), this improves a decoding success probability.

LTE V2X supports only broadcast service. Therefore, the SL HARQ feedback is not supported. NR V2X supports unicast, multicast, and a broadcast service, but supports the SL HARQ feedback only in a unicast scenario and a multicast scenario.

2. SL Resource Pool

In the NR system, SL transmission is based on a resource pool. The resource pool is a logical concept. A resource pool includes a plurality of physical resources, and any physical resource may be used to transmit data.

It should be noted that the network device configures one or more resource pools for a plurality of terminals, and the plurality of terminals share the one or more resource pools. When transmitting data, a terminal needs to use a physical resource from the resource pool for transmission. In one case, the terminal is controlled by the network device, and selects a physical resource from the resource pool based on indication information sent by the network device, to transmit data. In another case, the terminal independently selects a physical resource from the resource pool to transmit data.

3. Subchannel

Each resource pool contains one or more subchannels. According to a progress of a current related communications standard, sizes of frequency domain resources (in other words, quantities of physical resource blocks (PRB)) of all subchannels in a resource pool are the same. Sizes of frequency domain resources of subchannels in different resource pools may be the same or may be different.

Figure 2:
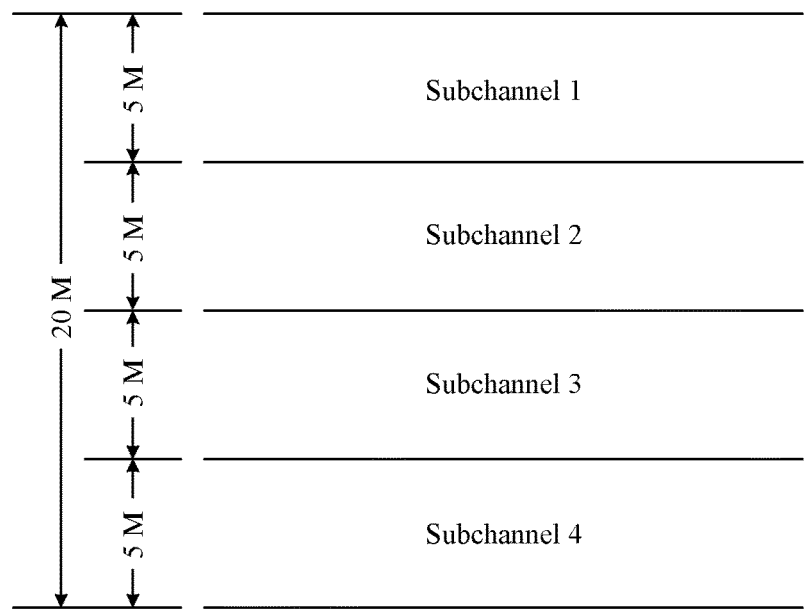
FIG. 2 is a schematic diagram of a subchannel according to an embodiment of this application.

For example, referring to FIG. 2, if a bandwidth occupied by a physical resource in a resource pool is 20 M, and 20 M is divided into four subchannels, a bandwidth occupied by one subchannel is 5 M.

A quantity of subchannels included in a resource pool and a bandwidth occupied by each subchannel may be configured by the network device for the terminal.

4. Physical Sidelink Control Channel (PSCCH), PSSCH and PSFCH

The subchannel may include a PSCCH, a PSSCH, and a PSFCH. The PSCCH is used to carry control information of SL data, and the control information may be specifically carried in sidelink control information (SCI) on the PSCCH. The PSSCH is used to carry the SL data. The PSFCH is used to carry a HARQ feedback for the SL data.

Figures 3A, 3B:
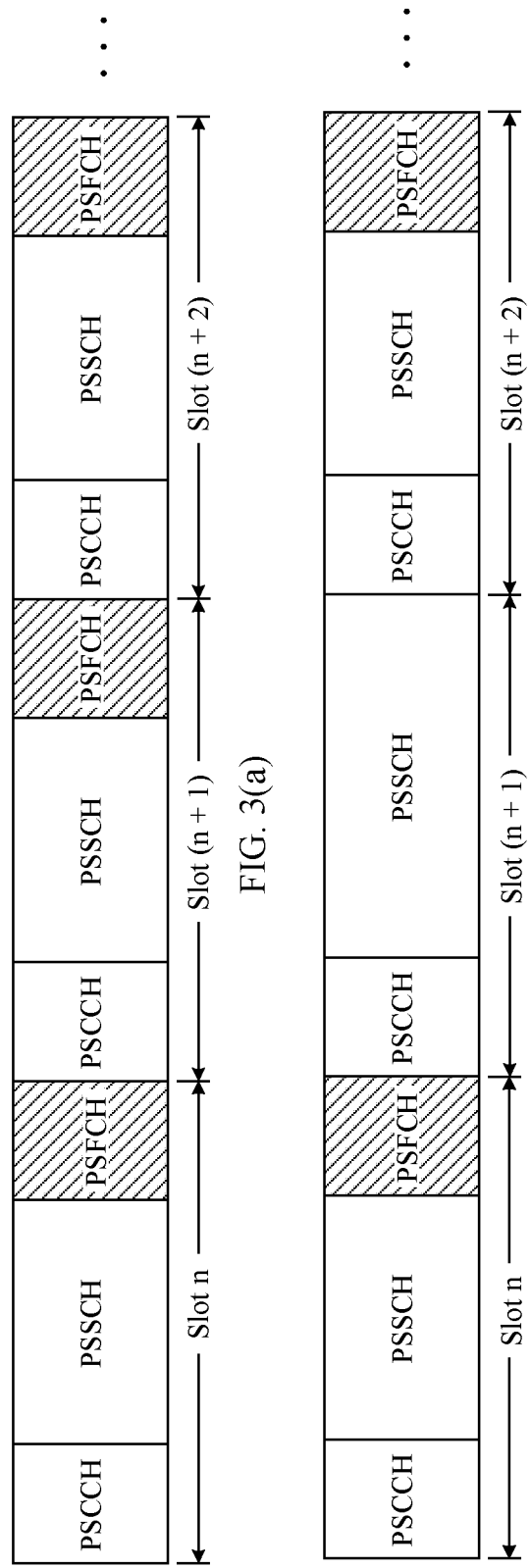
FIG. 3(a), FIG. 3(b), FIG. 4(a), and FIG. 4(b) are schematic diagrams of resources occupied by a channel on a sidelink according to an embodiment of this application.

In current discussion, it is considered that the PSFCH includes one or two symbols in time domain and includes one or more PRBs in frequency domain, and the one or more PRBs are some of frequency domain resources of the PSSCH. In a resource pool, a period of a PSFCH time-frequency resource (referred to as a PSFCH resource for short) is N slots, and a value of N is currently 1, 2, or 4. For example, FIG. 3(a) and FIG. 3(b) respectively show schematic diagrams of locations of PSFCH resources when N=1 and N=2.

Figures 4A, 4B:
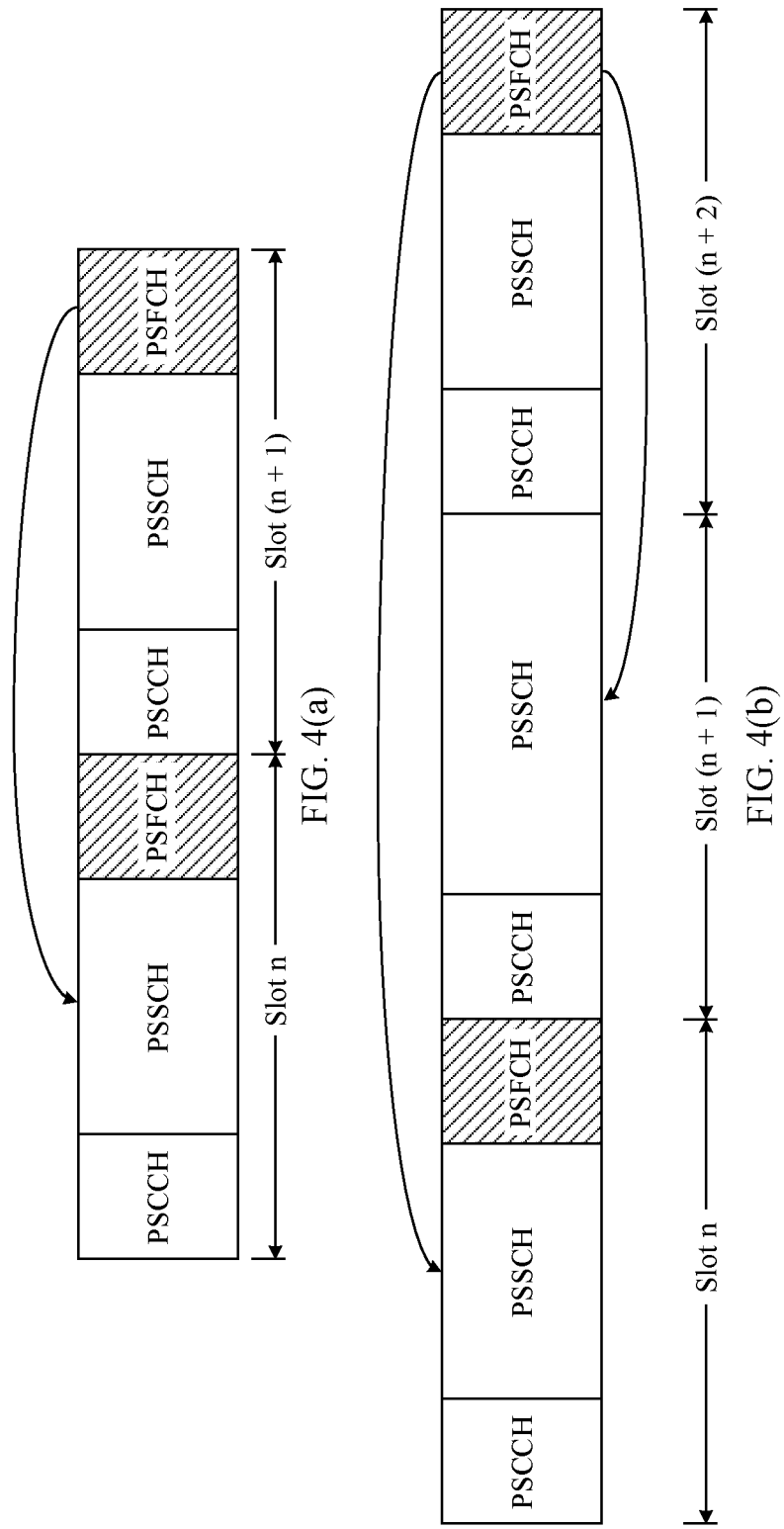

For a PSSCH in a slot n (n is an integer greater than or equal to 0), a PSFCH corresponding to the PSSCH appears in a slot (n+a), and a is a minimum integer greater than or equal to K. Currently, a value of K is not determined. If all terminals have the same K, PSFCHs corresponding to N PSSCHs need to share one PSFCH resource. For example, referring to FIG. 4(a), if N=1 and a=1, the HARQ feedback needs to be performed, by using PSFCH resources in a slot (n+1), on SL data carried on a PSSCH in the slot n. Referring to FIG. 4(b), if N=2 and a=1, the HARQ feedback needs to be performed, by using PSFCH resources in a slot (n+2), on SL data carried on a PSSCH in a slot n and SL data carried on a PSSCH in a slot (n+1). The HARQ feedback needs to be performed, by using some of the PSFCH resources in the slot (n+2), on the SL data carried on the PSSCH in the slot n. The HARQ feedback needs to be performed, by using the other PSFCH resources of the PSFCH resources in the slot (n+2), on the SL data carried on the PSSCH in the slot (n+1).

For ease of description, in this embodiment of this application, "sending (or receiving) SL data carried on one PSSCH" is described as "sending (or receiving) a PSSCH".

5. Sequence Interval

A PSFCH resource may carry a sequence, the sequence has a specific sequence interval, and the sequence interval is a quantity of bits by which cyclic shift is performed on a sequence. For example, (1, 2, 3, 4) is a sequence, and then a sequence (2, 3, 4, 1) is obtained by performing cyclic shift by one bit, and a sequence interval between the two sequences is 1. For sequences on PSFCH resources on all subchannels, sequence intervals may be the same or may be different, and may be specifically configured by the network device.

In a current communications standard, a sequence on a PSFCH resource including one PRB is used to represent an ACK/a NACK. There are a total of 12 subcarriers on one PRB. Therefore, a maximum of 12 mutually orthogonal sequences can be supported. These sequences are obtained by performing cyclic shift on a base sequence (for example, a sequence in a physical uplink control channel (PUCCH) format 0). The base sequence may be referred to as a sequence 0, and a sequence obtained by shifting x may be referred to as a sequence x. When different sequences are used to identify different ACKs/NACKs, a bit error rate between the different ACKs/NACKs is related to a sequence interval, and a larger sequence interval indicates a lower bit error rate.

Figure 5:
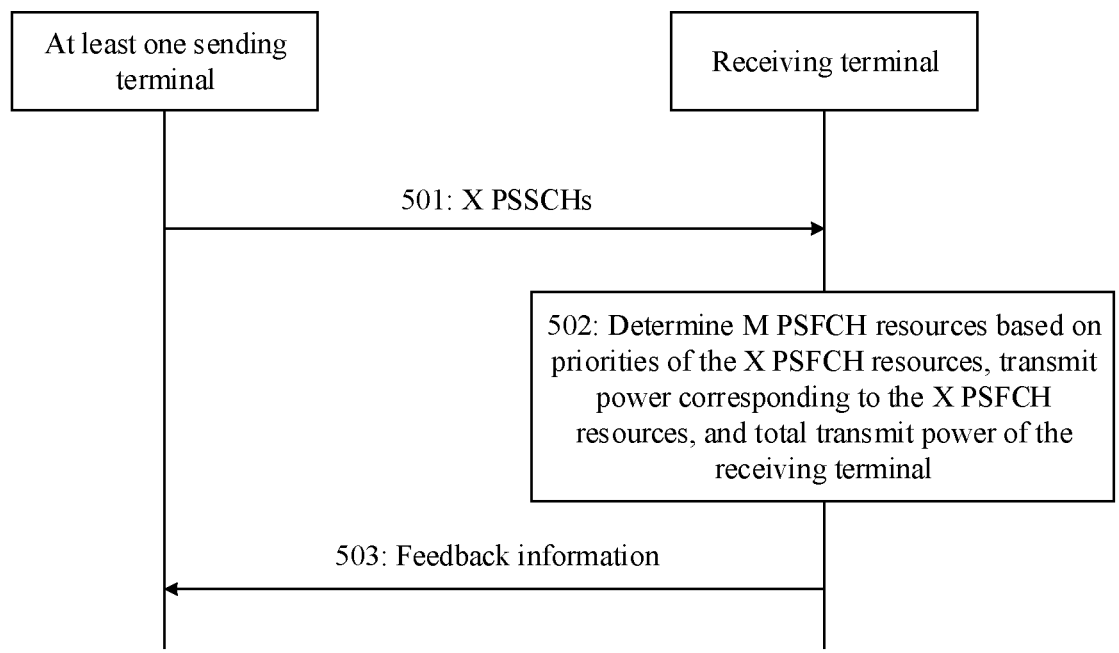
FIG. 5 is a flowchart of a communications method according to an embodiment of this application.

To resolve the problem proposed in the background, an embodiment of this application provides a communications method (which may also be considered as a PSFCH resource determining method). As shown in FIG. 5, the method includes the following steps.

501: At least one sending terminal sends X PSSCHs to a receiving terminal. Correspondingly, the receiving terminal receives the X PSSCHs from the at least one sending terminal. X is an integer greater than 1.

Any one of the at least one sending terminal and the receiving terminal may perform unicast communication, or may perform multicast communication (in this case, the receiving terminal is one of all receiving terminals in the multicast communication).

Figures 6A, 6B, 6C:
FIG. 6(a), FIG. 6(b), and FIG. 6(c) are schematic diagrams of PSFCH resources according to an embodiment of this application.

There may be one or more sending terminals. One sending terminal may send one PSSCH to the receiving terminal, or may send a plurality of PSSCHs to the receiving terminal. For example, referring to FIG. 6(a), if X=2, N=2, and a=1, a sending terminal may send a PSSCH to the receiving terminal in the slot n by using a subchannel 1, and send another PSSCH to the receiving terminal in the slot (n+1) by using the subchannel 1. For another example, referring to FIG. 6(b), if X=2, N=1, and a=1, a sending terminal 1 may send a PSSCH to the receiving terminal in the slot n by using a subchannel 1, and a sending terminal 2 may send another PSSCH to the receiving terminal in the slot n by using a subchannel 2. For another example, if X=3, N=2, and a=1, a sending terminal 1 may send a PSSCH to the receiving terminal in the slot (n+1) by using the subchannel 1, and a sending terminal 2 may send a PSSCH to the receiving terminal in each of the slot n and the slot (n+1) by using the subchannel 2.

One PSSCH corresponds to one PSFCH resource, feedback information of one PSSCH is carried on a corresponding PSFCH resource, and X PSFCH resources corresponding to the X PSSCHs have a same time domain resource. For example, there are two PSFCH resources in both FIG. 6(a) and FIG. 6(b), and the two PSFCH resources have a same time domain resource. There are three PSFCH resources in FIG. 6(c), and the three PSFCH resources have a same time domain resource. It should be noted that a period of the PSFCH resources is N slots. When N is greater than 1, N PSSCHs may need to share the PSFCH resources. Therefore, the PSFCH resources shared by the N PSSCHs are divided into N parts (the PSFCH resources may be evenly divided or unevenly divided). In this case, the N parts are considered as N PSFCH resources. For example, referring to FIG. 6(*a*), PSFCH resources in the slot (n+2) are two PSFCH resources, one PSFCH resource corresponds to the PSSCH in the slot n, and the other PSFCH resource corresponds to the PSSCH in the slot (n+1). This is also true to PSFCH resources that are in the slot (n+2) and that are on the subchannel 1 and the subchannel 2 in FIG. 6(*c*). One PSFCH resource that is in the slot (n+2) and that is on the subchannel 1 in FIG. 6(*c*) corresponds to the PSSCH in the slot (n+1). After the PSFCH resources in the slot (n+2) are divided into two parts, one part is the PSFCH resource corresponding to the PSSCH in the slot (n+1).

502: The receiving terminal determines M PSFCH resources based on priorities of the X PSFCH resources, transmit power corresponding to the X PSFCH resources, and total transmit power of the receiving terminal.

M is less than or equal to M', and M' is an upper limit of a quantity of PSFCH resources occupied on a same time domain resource, that is, a maximum quantity of PSFCH resources that can be simultaneously used by the receiving terminal. M' may be a value specified in a communications standard.

Optionally, the priorities of the PSFCH resources may be classified according to a priority rule. The priority of the PSFCH resource may be determined based on a corresponding PSCCH or PSSCH.

Optionally, the transmit power corresponding to the PSFCH resources may be obtained through channel measurement. For example, when a channel measurement result indicates that channel quality is poorer, transmit power corresponding to a PSFCH resource may be higher.

503: The receiving terminal sends feedback information to some or all of the at least one sending terminal on the M PSFCH resources. Correspondingly, the some or all of the at least one sending terminal receive the feedback information from the receiving terminal on the M PSFCH resources.

The feedback information may be a HARQ feedback that is of the receiving terminal and that is for the PSSCH sent by the sending terminal, and may be specifically an ACK or a NACK.

It should be noted that, because M may be less than X, the receiving terminal may send feedback information to only some of the at least one sending terminal, and may subsequently send or not send feedback information to the remaining sending terminals. This is not limited in this application.

According to the method provided in this embodiment of this application, the receiving terminal may determine the M PSFCH resources based on the priorities of the PSFCH resources, the transmit power corresponding to the PSFCH resources, and the total transmit power of the receiving terminal, to send the M PSFCH resources based on a sending capability (namely, the total transmit power) of the receiving terminal. This improves overall performance of a network system.

During specific implementation, step 502 may include: The receiving terminal sequentially accumulates, in descending order of the priorities of the X PSFCH resources, the transmit power corresponding to the PSFCH resources, and determines the M PSFCH resources based on the accumulation.

It is assumed that after the X PSFCH resources are classified according to the priority rule, the X PSFCH resources are classified into L priorities. A quantity of PSFCH resources with an $i^{th}$ priority in the L priorities is denoted as li, and a smaller value of i indicates a higher priority. In this case, the transmit power corresponding to the PSFCH resources is accumulated in descending order of the priorities of the X PSFCH resources, and an accumulation result may be expressed as:

$$\Sigma_{j=1}^{k} P_j.$$

$P_j$ represents transmit power corresponding to a $j^{th}$ PSFCH resource sorted in descending order of the priorities, j is an integer greater than 0, and k is a quantity of accumulated PSFCH resources.

The following separately describes, by using a case 1 to a case 3, a process of determining the M PSFCH resources based on the accumulation.

Case 1: An accumulation result of accumulating transmit power corresponding to m PSFCH resources is less than or equal to the total transmit power of the receiving terminal, and m is equal to M', or an accumulation result of accumulating transmit power corresponding to m PSFCH resources is equal to the total transmit power of the receiving terminal, and m is less than M'.

In the case 1, the receiving terminal determines that the m PSFCH resources are the M PSFCH resources.

In other words, when m=M' and meets $\Sigma_{j=1}^{m} P_j \leq P_{max}$, or when m<M' and meets $\Sigma_{j=1}^{m} P_j = P_{max}$, the receiving terminal determines that the m accumulated PSFCH resources are the M PSFCH resources. In this embodiment of this application, $P_{max}$ represents the total transmit power of the receiving terminal.

For example, it is assumed that there are six PSFCH resources, the six PSFCH resources are marked as a PSFCH 1 to a PSFCH 6 and are classified into three priorities, and a quantity of PSFCH resources with each priority is 2. The PSFCH 1 and the PSFCH 2 are of a first priority, the PSFCH 3 and the PSFCH 4 are of a second priority, and the PSFCH 5 and the PSFCH 6 are of a third priority. If M'=2, $P_1 \leq P_{max}$, and $P_1+P_2 \leq P_{max}$, the receiving terminal determines that the PSFCH 1 and the PSFCH 2 are the M PSFCH resources. If M'=3, $P_1 \leq P_{max}$, and $P_1+P_2=P_{max}$, the receiving terminal determines that the PSFCH 1 and the PSFCH 2 are the M PSFCH resources.

Case 2: An accumulation result of accumulating transmit power corresponding to m PSFCH resources is less than or equal to the total transmit power of the receiving terminal, an accumulation result of accumulating transmit power corresponding to m+1 PSFCH resources is greater than the total transmit power of the receiving terminal, and m+1 is less than or equal to M'.

In the case 2, the receiving terminal determines that the m PSFCH resources are the M PSFCH resources.

In other words, when $\Sigma_{j=1}^{m} P_j \leq P_{max}$, m+1≤M', and $\Sigma_{j=1}^{m+1} P_j > P_{max}$, the receiving terminal determines that the m accumulated PSFCH resources are the M PSFCH resources.

For example, it is assumed that there are six PSFCH resources, the six PSFCH resources are marked as a PSFCH 1 to a PSFCH 6 and are classified into three priorities, and a quantity of PSFCH resources with each priority is 2. The PSFCH 1 and the PSFCH 2 are of a first priority, the PSFCH 3 and the PSFCH 4 are of a second priority, and the PSFCH 5 and the PSFCH 6 are of a third priority. If M'=2 $P_1 \leq P_{max}$, and $P_1+P_2 > P_{max}$, the receiving terminal determines that the PSFCH 1 is the M PSFCH resources. If M'=4, $P_1 \leq P_{max}$, $P_1+P_2 \leq P_{max}$, $P_1+P_2+P_3 \leq P_{max}$, and $P_1+P_2+P_3+P_4 > P_{max}$, the receiving terminal determines that the PSFCH 1, the PSFCH 2, and the PSFCH 3 are the M PSFCH resources.

Case 3: An accumulation result of accumulating transmit power corresponding to m PSFCH resources is less than or equal to the total transmit power of the receiving terminal, an accumulation result of accumulating transmit power corresponding to m+1 PSFCH resources is greater than the total transmit power of the receiving terminal, and m+1 is less than or equal to M'.

In the case 3, the receiving terminal may determine the M PSFCH resources in any one of the following manner 1 to manner 4.

Manner 1

The manner 1 specifically includes the following step (11) and step (12).

(11) The receiving terminal reduces transmit power corresponding to an $(m+1)^{th}$ PSFCH resource in the m+1 PSFCH resources, so that the accumulation result of accumulating the transmit power corresponding to the m+1 PSFCH resources is less than or equal to the total transmit power of the receiving terminal.

(12) The receiving terminal determines that the m+1 PSFCH resources are the M PSFCH resources.

In other words, when $\Sigma_{j=1}^{m} P_j \leq P_{max}$, $\Sigma_{j=1}^{m+1} P_j > P_{max}$, and m+1≤M', the receiving terminal reduces the transmit power corresponding to the $(m+1)^{th}$ PSFCH resource, so that the accumulation result of accumulating the transmit power corresponding to the m+1 PSFCH resources is less than or equal to the total transmit power of the receiving terminal. The receiving terminal determines that the m+1 PSFCH resources are the M PSFCH resources.

Specifically, the receiving terminal may reduce the transmit power corresponding to the $(m+1)^{th}$ PSFCH resource to $\beta$ ($\beta$ is greater than 0 and less than or equal to 1) times of the original transmit power.

For example, it is assumed that there are six PSFCH resources, the six PSFCH resources are marked as a PSFCH 1 to a PSFCH 6 and are classified into three priorities, and a quantity of PSFCH resources with each priority is 2. The PSFCH 1 and the PSFCH 2 are of a first priority, the PSFCH 3 and the PSFCH 4 are of a second priority, and the PSFCH 5 and the PSFCH 6 are of a third priority. If M'=4, $P_1 \leq P_{max}$, $P_1+P_2 \leq P_{max}$, $P_1+P_2+P_3 \leq P_{max}$, and $P_1+P_2+P_3+P_4 > P_{max}$, the receiving terminal may reduce $P_4$ to $\beta P_4$, so that $P_1+P_2+P_3+\beta P_4 \leq P_{max}$, and the receiving terminal may determine that the PSFCH 1, the PSFCH 2, the PSFCH 3, and the PSFCH 4 are the M PSFCH resources.

Manner 2

The manner 2 specifically includes the following step (21) and step (22).

(21) The receiving terminal reduces transmit power corresponding to a PSFCH resource with a first priority in the m+1 PSFCH resources, so that the accumulation result of accumulating the transmit power corresponding to the m+1 PSFCH resources is less than or equal to the total transmit power of the receiving terminal, where the first priority is a priority of an $(m+1)^{th}$ PSFCH resource in the m+1 PSFCH resources.

(22) The receiving terminal determines that the m+1 PSFCH resources are the M PSFCH resources.

In other words, when $\Sigma_{j=1}^{m} P_j \leq P_{max}$, $\Sigma_{j=1}^{m+1} P_j > P_{max}$, and m+1≤M', the receiving terminal reduces the transmit power corresponding to the PSFCH resource with the first priority in the m+1 PSFCH resources, so that the accumulation result of accumulating the transmit power corresponding to the m+1 PSFCH resources is less than or equal to the total transmit power of the receiving terminal, and the receiving terminal determines that the m+1 PSFCH resources are the M PSFCH resources.

If there are x2 PSFCH resources with the first priority in the m+1 PSFCH resources, a same proportion may be reduced when transmit power corresponding to the x2 PSFCH resources is reduced. For example, the transmit power corresponding to the x2 PSFCH resources is reduced to $\beta$ ($\beta$ greater than 0 and less than or equal to 1) times of the original transmit power, and different proportions may also be reduced. For example, transmit power corresponding to some PSFCH resources in the x2 PSFCH resources is reduced to $\beta 1$ ($\beta 1$ is greater than 0 and less than or equal to 1) times of the original transmit power, and transmit power corresponding to some PSFCH resources is reduced to $\beta 2$ ($\beta 2$ is greater than 0 and less than or equal to 1) times of the original transmit power. An example in which a same proportion is reduced is used below in this application for description.

For example, it is assumed that there are six PSFCH resources, the six PSFCH resources are marked as a PSFCH 1 to a PSFCH 6 and are classified into three priorities, and a quantity of PSFCH resources with each priority is 2. The PSFCH 1 and the PSFCH 2 are of a first priority, the PSFCH 3 and the PSFCH 4 are of a second priority, and the PSFCH 5 and the PSFCH 6 are of a third priority. If M'=3, and $P_1 \leq P_{max}$, $P_1+P_2 \leq P_{max}$, and $P_1+P_2+P_3 > P_{max}$, the receiving terminal may reduce $P_3$ to $\beta P_3$, so that $P_1+P_2+\beta P_3 \leq P_{max}$, and the receiving terminal may determine that the PSFCH 1, the PSFCH 2, and the PSFCH 3 are the M PSFCH resources. If M'=4, and $P_1 \leq P_{max}$, $P_1+P_2 \leq P_{max}$, $P_1+P_2+P_3 \leq P_{max}$, and $P_1+P_2+P_3+P_4 > P_{max}$, the receiving terminal may reduce $P_3$ to $\beta P_3$, and reduce $P_4$ to $\beta P_4$, so that $P_1+P_2+\beta P_3+\beta P_4 \leq P_{max}$, and the receiving terminal may determine that the PSFCH 1, the PSFCH 2, the PSFCH 3, and the PSFCH 4 are the M PSFCH resources.

Manner 3

The manner 3 specifically includes the following step (31) and step (32).

(31) The receiving terminal reduces transmit power corresponding to x1 PSFCH resources with the first priority, so that an accumulation result of accumulating the transmit power corresponding to m+1−x2+x1 PSFCH resources is less than or equal to the total transmit power of the receiving terminal, where the first priority is a priority of an $(m+1)^{th}$ PSFCH resource in the m+1 PSFCH resources, x2 is a quantity of PSFCH resources with the first priority in the m+1 PSFCH resources, x1=min(x3, M'−(m+1−x2)), min is a minimum function, and x3 is a quantity of PSFCH resources with the highest priority.

(32) The receiving terminal determines that the m+1−x2+x1 PSFCH resources are the M PSFCH resources.

In other words, when $\Sigma_{j=1}^{m} P_j \leq P_{max}$, $\Sigma_{j=1}^{m+1} P_j > P_{max}$, and m+1≤M', the receiving terminal reduces the transmit power corresponding to the x1 PSFCH resources with the first priority, so that an accumulation result of accumulating transmit power corresponding to the m+1−x2+x1 PSFCH resources is less than or equal to the total transmit power of the receiving terminal, and the receiving terminal determines that the m+1−x2+x1 PSFCH resources are the M PSFCH resources.

If the first priority is an $n^{th}$ priority, the accumulation result of accumulating the transmit power corresponding to the m+1−x2+x1 PSFCH resources may be represented as:

$$\sum_{j=1}^{\Sigma_{i=1}^{n-1} l_i} P_j + \beta \sum_{j=1+\Sigma_{i=1}^{n-1} l_i}^{\min\{M', \Sigma_{i=1}^{n} l_i\}} P_j.$$

If $$\sum_{j=1}^{\sum_{i=1}^{n-1} li} P_j + \beta \sum_{j=1+\sum_{i=1}^{n-1} li}^{min\{M', \sum_{i=1}^{n} li\}} P_j \le P_{max},$$

the receiving terminal determines that the m+1−x2+x1 PSFCH resources are the M PSFCH resources.

It may be understood that, if m+1−x2, that is, a quantity of all PSFCH resources of all priorities higher than the first priority, min(x3, M'−(m+1−x2) means min(the quantity of PSFCH resources with the first priority, M'−the quantity of all PSFCH resources with all priorities higher than the first priority). A value of x1 is determined according to the method. This can ensure that the quantity of accumulated PSFCH resources is less than or equal to M'. It may be understood that the M PSFCH resources determined by the receiving terminal include all PSFCH resources with all priorities higher than the first priority, min (the quantity of PSFCH resources with the first priority, M'−the quantity of all PSFCH resources with all priorities higher than the first priority) PSFCH resources with the $n^{th}$ priority that are sent at the 13 times of the transmit power.

Similar to that in the manner 2, when the transmit power corresponding to the x1 PSFCH resources is reduced, a same proportion may be reduced, or different proportions may be reduced. For details, refer to the foregoing description for understanding. Details are not described again.

For example, it is assumed that there are six PSFCH resources, the six PSFCH resources are marked as a PSFCH 1 to a PSFCH 6 and are classified into three priorities, and a quantity of PSFCH resources with each priority is 2. The PSFCH 1 and the PSFCH 2 are of a first priority, the PSFCH 3 and the PSFCH 4 are of a second priority, and the PSFCH 5 and the PSFCH 6 are of a third priority. The following separately describes the manner 3 by using a case 1 to a case 3 as examples.

Case 1: If M'=4, and $P_1 \le P_{max}$, $P_1+P_2 \le P_{max}$, $P_1+P_2+P_3 \le P_{max}$, and $P_1+P_2+P_3+P_4 > P_{max}$, the receiving terminal reduces transmit power of min(2, 4−2)=2 PSFCH resources with the second priority, in other words, reduces transmit power of the PSFCH 3 and the PSFCH 4, so that $P_1+P_2+\beta P_3+\beta P_4 \le P_{max}$. And the receiving terminal determines that the PSFCH 1, the PSFCH 2, the PSFCH 3, and the PSFCH 4 are the M PSFCH resources.

Case 2: If M'=3, and $P_1 \le P_{max}$, $P_1+P_2 \le P_{max}$, and $P_1+P_2+P_3 \ge P_{max}$, the receiving terminal reduces transmit power of min(2, 3−2)=1 PSFCH resource with the second priority, in other words, reduces transmit power of the PSFCH 3, so that $P_1+P_2+\beta P_3 \le P_{max}$. And the receiving terminal determines the PSFCH 1, the PSFCH 2. PSFCH 2, and PSFCH 3 are the M PSFCH resources.

Case 3: If M'=4, and $P_1 \le P_{max}$, $P_1+P_2 \le P_{max}$, and $P_1+P_2+P_3 > P_{max}$, the receiving terminal reduces transmit power of min(2, 4−2)=2 PSFCH resources with the second priority, in other words, reduces transmit power of the PSFCH 3 and the PSFCH 4, so that $P_1+P_2+\beta P_3+\beta P_4 \le P_{max}$. And the receiving terminal determines that the PSFCH 1, the PSFCH 2, the PSFCH 3, and the PSFCH 4 are the M PSFCH resources.

Manner 4

The manner 4 specifically includes the following step (41) and step (42).

(41) The receiving terminal determines a first combination from a plurality of combinations, where the plurality of combinations are combinations of PSFCH resources with a first priority, and the first priority is a priority of an $(m+1)^{th}$ PSFCH resource in the m+1 PSFCH resources.

The plurality of combinations may be some or all of all combinations of the PSFCH resources with the first priority.

(42) The receiving terminal determines that m+1−x2+x3 accumulated PSFCH resources are the M PSFCH resources, where x2 is a quantity of PSFCH resources with the first priority in the m+1 PSFCH resources, and x3 is a quantity of PSFCH resources in the first combination.

In other words, when $\Sigma_{j=1}^{m} P_j \le P_{max}$, $\Sigma_{j=1}^{m+1} P_j > P_{max}$ and m+1≤M', the receiving terminal may traverse the combinations of the PSFCH resources with the first priority, determine the first combination, and further determine the m+1−x2+x3 accumulated PSFCH resources as the M PSFCH resources.

Compared with another combination, the first combination meets the following feature 1 to feature 3.

Feature 1: A sum of the quantity of PSFCH resources in the first combination and a quantity of all PSFCH resources with priorities higher than the first priority is less than or equal to M'.

Feature 2: A sum of transmit power corresponding to the PSFCH resources in the first combination and transmit power corresponding to all the PSFCH resources with the priorities higher than the first priority is less than or equal to the total transmit power of the receiving terminal.

If the first priority is an $n^{th}$ priority, the feature 2 may be represented as $$\sum_{j=1}^{\Sigma_{i=1}^{n-1} li} P_j + \sum_{j \in I} P_j \le P_{max},$$

where I is a combination of PSFCH resources with the $n^{th}$ priority.

Feature 3: The sum of the quantity of PSFCH resources with the first combination and the quantity of all PSFCH resources with the priorities higher than the first priority is a maximum. In other words, the combination selected by the receiving terminal is a combination that meets the feature 1 and the feature 2 and that can make M in the determined M PSFCH resources be the maximum. Specifically, in all Is that meet the feature 1 and the feature 2, the quantity of PSFCH resources is the maximum in the selected combination in which the quantity of PSFCH resources is less than or equal to $M' - \Sigma_{i=1}^{n-1} li$.

It should be noted that there may be one or more combinations satisfying the feature 1 to the feature 3. If there are a plurality of combinations, the receiving terminal may select one combination from the plurality of combinations as the first combination.

Optionally, compared with the another combination, the first combination further meets the following feature 4.

Feature 4: the sum of the transmit power corresponding to the PSFCH resources in the first combination and the transmit power corresponding to all the PSFCH resources with the priorities higher than the first priority is a minimum (in other words, total power is the minimum); or a difference between the total transmit power of the receiving terminal and the sum of the transmit power corresponding to the PSFCH resources in the first combination and the transmit power corresponding to all the PSFCH resources with the priorities higher than the first priority is a maximum (in other words, a power headroom is a maximum).

It may be understood that, when there are a plurality of combinations satisfying the feature 1 to the feature 3, the receiving terminal may select one combination from the plurality of combinations as the first combination based on the feature 4. Specifically, the receiving terminal may select a combination satisfying $$\max_I \left\{ P_{max} - \sum_{j=1}^{\sum_{i=1}^{n-1} li} P_j - \sum_{j \in I} P_j \right\}$$

(namely, the maximum power headroom) or $$\min_I \left\{ \sum_{j=1}^{\sum_{i=1}^{n-1} li} P_j + \sum_{j \in I} P_j \right\}$$

(namely, the minimum total power). The receiving terminal may determine that $\Sigma_{i=1}^{n-1} li$ PSFCH resources with priorities higher than the $n^{th}$ priority and the PSFCH resources in a combination I with the $n^{th}$ priority are the M PSFCH resources.

For example, it is assumed that there are six PSFCH resources, the six PSFCH resources are marked as a PSFCH 1 to a PSFCH 6 and are classified into three priorities, and a quantity of PSFCH resources with each priority is 2. The PSFCH 1 and the PSFCH 2 are of a first priority, the PSFCH 3 and the PSFCH 4 are of a second priority, and the PSFCH 5 and the PSFCH 6 are of a third priority. The following separately describes the manner 4 by using a case 1 and a case 2 as examples.

Case 1: When M'=4, the following conditions are met:
$P_1 \leq P_{max}$, $P_1+P_2 \leq P_{max}$, $P_1+P_2+P_3 \leq P_{max}$, and $P_1+P_2+P_3+P_4 > P_{max}$.

All possible combinations of PSFCH resources that meet a quantity of PSFCH resources less than or equal to M'−l1=2 with the second priority include: I1={PSFCH 3}, I2={PSFCH 4}, I3={PSFCH 3, PSFCH 4}. All possible combinations are traversed, and the following power requirements are met:

$P_1+P_2+P_3 \leq P_{max}$ and $P_1+P_2+P_4 \leq P_{max}$. In this case, the upper limit of M'=4 cannot be met, and there are a maximum of three PSFCH resources in the M PSFCHs.

Because a quantity of PSFCH resources in I1 is the same as a quantity of PSFCH resources in I2, a combination that can minimize total power of the M PSFCH resources or maximize the power headroom may be selected from I1 and I2.

The minimum total power is used as the standard:
When $P_1+P_2+P_3 \leq P_1+P_2+P_4$, I1 may make the total power minimum, and the receiving terminal determines that the PSFCH 1, the PSFCH 2, and the PSFCH 3 are the M PSFCH resources.

When $P_1+P_2+P_3 > P_1+P_2+P_4$, I2 may make the total power minimum, and the receiving terminal determines that the transmission PSFCH 1, the PSFCH 2, and the PSFCH 4 are the M PSFCH resources.

The maximum power headroom is used as the standard:

$\Delta 1 = P_{max}-P_1-P_2-P_3$ and $\Delta 2 = P_{max}-P_1-P_2-P_4$.

The Pmax used for calculating $\Delta 1$ is calculated based on the PSFCH 1, the PSFCH 2, the PSFCH 3, and power of hardware of the receiving terminal. The Pmax used for calculating $\Delta 2$ is calculated based on the PSFCH 1, the PSFCH 2, the PSFCH 4, and power of hardware of the receiving terminal. Pmax used for calculating $\Delta 1$ and Pmax used for calculating $\Delta 2$ may have same values or different values.

When $\Delta 1 \geq \Delta 2$, I1 may make the total power maximum, and the receiving terminal determines that the PSFCH 1, the PSFCH 2, and the PSFCH 3 are the M PSFCH resources.

When $\Delta 1 < \Delta 2$, I2 may make the total power maximum, and the receiving terminal determines that the transmission PSFCH 1, the PSFCH 2, and the PSFCH 4 are the M PSFCH resources.

Case 2: When M'=3, the following conditions are met:

$P_1 \leq P_{max}$, $P_1+P_2 \leq P_{max}$, $P_1+P_2+P_3 \leq P_{max}$

All possible combinations of PSFCH resources that meet a quantity of PSFCH resources less than or equal to M'−l1=1 with the second priority include: I1={PSFCH 3}, and I2={PSFCH 4}. A difference from M'=4 in the case 1 lies in that: The combination of I3={PSFCH 3, PSFCH 4} is missing. All possible combinations are traversed, and the following power requirements are met:

$P_1+P_2+P_3 \leq P_{max}$, and $P_1+P_2+P_4 \leq P_{max}$.

Because a quantity of PSFCH resources in I1 is the same as a quantity of PSFCH resources in I2, a combination that can minimize total power of the M PSFCH resources or maximize the power headroom may be selected from I1 and I2.

The minimum total power is used as the standard:
When $P_1+P_2+P_3 \leq P_1+P_2+P_4$, I1 may make the total power minimum, and the receiving terminal determines that the PSFCH 1, the PSFCH 2, and the PSFCH 3 are the M PSFCH resources.

When $P_1+P_2+P_3 > P_1+P_2+P_4$, I2 may make the total power minimum, and the receiving terminal determines that the transmission PSFCH 1, the PSFCH 2, and the PSFCH 4 are the M PSFCH resources.

The maximum power headroom is used as the standard:

$\Delta 1 = P_{max}-P_1-P_2-P_3$, and $\Delta 2 = P_{max}-P_1-P_2-P_4$.

The Pmax used for calculating $\Delta 1$ is calculated based on the PSFCH 1, the PSFCH 2, the PSFCH 3, and power of hardware of the receiving terminal. The Pmax used for calculating $\Delta 2$ is calculated based on the PSFCH 1, the PSFCH 2, the PSFCH 4, and power of hardware of the receiving terminal. Pmax used for calculating $\Delta 1$ and Pmax used for calculating $\Delta 2$ may have same values or different values.

When $\Delta 1 \geq \Delta 2$, I1 may make the total power maximum, and the receiving terminal determines that the PSFCH 1, the PSFCH 2, and the PSFCH 3 are the M PSFCH resources.

When $\Delta 1 < \Delta 2$, I2 may make the total power maximum, and the receiving terminal determines that the PSFCH 1, the PSFCH 2, and the PSFCH 4 are the M PSFCH resources.

Compared with the manner 4, the manner 1, the manner 2, and the manner 3 have simpler implementation processes. However, compared with the manner 1, the manner 2, and the manner 3, the manner 4 has higher complexity, but can enable the sum of the transmit power corresponding to the determined M PSFCH resources to be the minimum.

The foregoing embodiment provides a process of selecting the M PSFCH resources and details of power control. It can be ensured that the M PSFCH resources are sent within the sending capability of the receiving terminal (that is, within the total transmit power of the receiving terminal). In addition, it can be ensured that the quantity of the determined M PSFCH resources is less than or equal to the upper limit of the quantity of PSFCH resources occupied on the same time domain resource. This improves overall performance of a network system. It should be noted that in the foregoing embodiments, the method provided in this embodiment of this application is described by using an example in which PSSCH resources are in a one-to-one correspondence with PSFCH resources. During actual implementation, a plurality of PSSCHs sent by one sending terminal may also correspond to one PSFCH resource. In this case, a method for selecting the M PSFCH resources is similar, and a difference only lies in that the receiving terminal needs to perform code division (for example, perform code division by using different sequences described in the foregoing embodiment) on a same PSFCH resource to send feedback information for a plurality of PSSCHs.

The foregoing mainly describes the solutions in the embodiments of this application from a perspective of interaction between the network elements. It may be understood that, to implement the foregoing functions, each network element, for example, the sending terminal and the receiving terminal, includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the sending terminal and the receiving terminal may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in this embodiment of this application, unit division is an example, and is merely a logical function division. In actual implementation, another division manner may be used.

Figure 7:
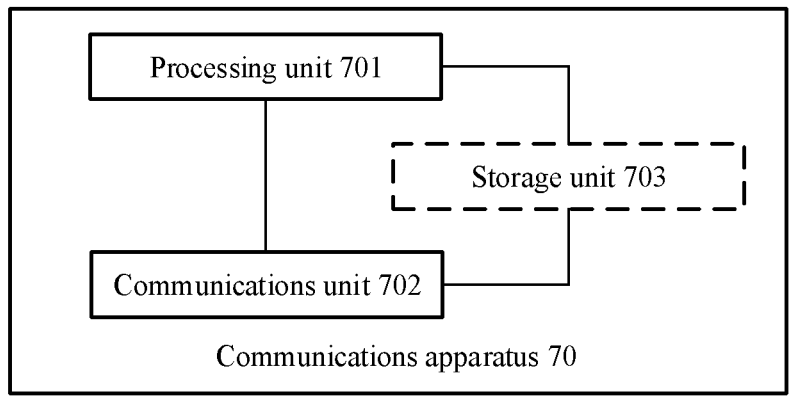
FIG. 7 is a schematic diagram of compositions of a communications apparatus according to an embodiment of this application.

When the integrated unit is used, FIG. 7 is a possible schematic structural diagram of the communications apparatus (denoted as a communications apparatus 70) in the foregoing embodiments. The communications apparatus 70 includes a processing unit 701 and a communications unit 702, and may further include a storage unit 703. The schematic structural diagram shown in FIG. 7 may be used to show a structure of the sending terminal or the receiving terminal in the foregoing embodiments.

When the schematic structural diagram shown in FIG. 7 is used to show the structure of the sending terminal in the foregoing embodiment, the processing unit 701 is configured to control and manage an action of the sending terminal. For example, the processing unit 701 is configured to support the sending terminal in performing 501 and 503 in FIG. 5, and/or an action performed by the sending terminal in another process described in the embodiments of this application. The processing unit 701 may communicate with another network entity by using the communications unit 702, for example, communicate with the receiving terminal shown in FIG. 5. The storage module 703 is configured to store program code and data of the sending terminal.

When the schematic structural diagram shown in FIG. 7 is used to show the structure of the sending terminal in the foregoing embodiment, the communications apparatus 70 may be a device, or may be a chip in a device.

When the schematic structural diagram shown in FIG. 7 is used to show the structure of the receiving terminal in the foregoing embodiment, the processing unit 701 is configured to control and manage an action of the receiving terminal. For example, the processing unit 701 is configured to support the receiving terminal in performing 501 to 503 in FIG. 5, and/or an action performed by the receiving terminal in another process described in the embodiments of this application. The processing unit 701 may communicate with another network entity by using the communications unit 702, for example, communicate with the sending terminal shown in FIG. 5. The storage unit 703 is configured to store program code and data of the receiving terminal.

When the schematic structural diagram shown in FIG. 7 is used to show the structure of the receiving terminal in the foregoing embodiment, the communications apparatus 70 may be a device, or may be a chip in a device.

When the communications apparatus 70 is the device, the processing unit 701 may be a processor or a controller, and the communications unit 702 may be a communications interface, a transceiver, a transceiver circuit, a transceiver apparatus, or the like. The communications interface is a collective term, and may include one or more interfaces. The storage unit 703 may be a memory. When the communications apparatus 70 is the chip in the device, the processing unit 701 may be a processor or a controller, and the communications unit 702 may be an input interface and/or an output interface, a pin, a circuit, or the like. The storage unit 703 may be a storage unit (for example, a register or a cache) in the chip, or may be a storage unit (for example, a read-only memory or a random access memory) that is in the device and that is located outside the chip.

The communications unit may also be referred to as a transceiver unit. An antenna and a control circuit that have receiving and sending functions in the communications apparatus 70 may be considered as the communications unit 702 in the communications apparatus 70, and a processor that has a processing function in the communications apparatus 70 may be considered as the processing unit 701 in the communications apparatus 70. Optionally, a component configured to implement a receiving function in the communications unit 702 may be considered as a receiving unit. The receiving unit is configured to perform the receiving step in the embodiments of this application. The receiving unit may be a receiver, a receiver, a receiver circuit, or the like. A component configured to implement a sending function in the communications unit 702 may be considered as a sending unit. The sending unit is configured to perform the sending step in the embodiments of this application. The sending unit may be a transmitter, a transmitter, a sending circuit, or the like.

When an integrated unit in FIG. 7 is implemented in a form of a software function module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes a plurality of instructions for instructing a computer device (which may be a personal computer, a server, or a network device) or a processor (processor) to perform all or some of the steps of the methods described in the embodiments of this application. The storage medium that stores the computer software product includes any medium that can store program code, for example, a USB flash drive, a removable hard disk, a read-only memory (read-only memory, ROM), a random access memory (random access memory, RAM), a magnetic disk, or an optical disc.

The unit in FIG. 7 may alternatively be referred to as a module. For example, the processing unit may be referred to as a processing module.

Figure 8:
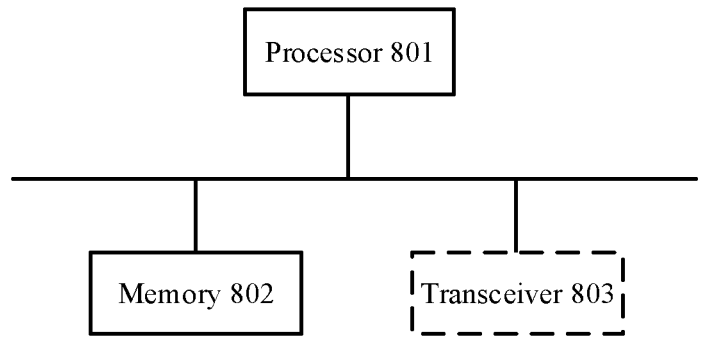
FIG. 8 and FIG. 9 each are a schematic structural diagram of hardware of a communications apparatus according to an embodiment of this application.
Figure 9:
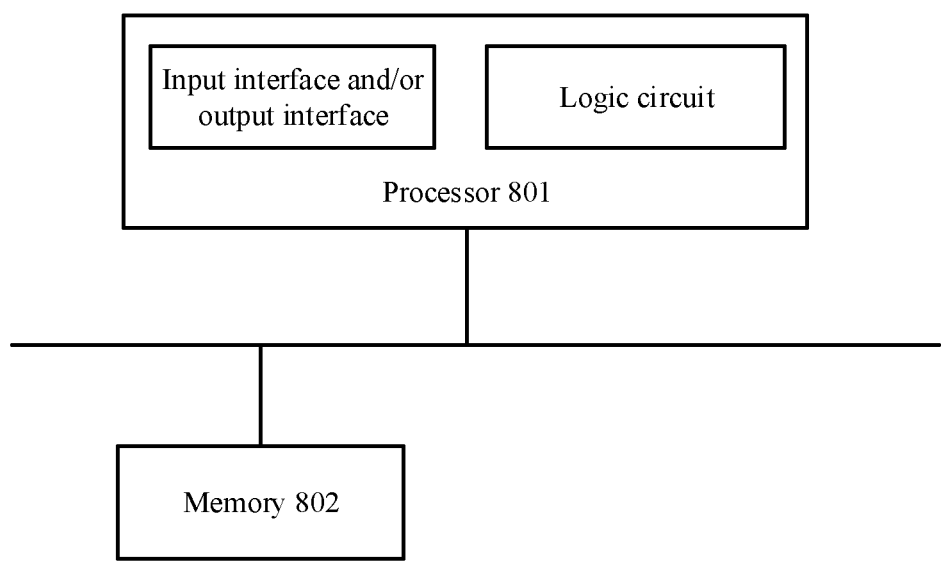

An embodiment of this application further provides a schematic structural diagram of hardware of a communications apparatus. Referring to FIG. 8 or FIG. 9, the communications apparatus includes a processor 801, and optionally, further includes a memory 802 connected to the processor 801.

The processor 801 may be a general-purpose central processing unit (CPU), a microprocessor, an application-specific integrated circuit (ASIC), or one or more integrated circuits configured to control program execution of the solutions of this application. The processor 801 may alternatively include a plurality of CPUs, and the processor 801 may be a single-core processor (single-CPU) or a multi-core processor (multi-CPU). The processor herein may refer to one or more devices, circuits, or processing cores configured to process data (for example, a computer program instruction).

The memory 802 may be a ROM or another type of static storage device that can store static information and an instruction, or a RAM or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 802 is not limited in this embodiment of this application. The memory 802 may exist independently, or may be integrated into the processor 801. The memory 802 may include computer program code. The processor 801 is configured to execute the computer program code stored in the memory 802, to implement a method provided in the embodiments of this application.

In a first possible implementation, referring to FIG. 8, the communications apparatus further includes a transceiver 803. The processor 801, the memory 802, and the transceiver 803 are connected via a bus. The transceiver 803 is configured to communicate with another device or a communications network. Optionally, the transceiver 803 may include a transmitter and a receiver. A component configured to implement a receiving function in the transceiver 803 may be considered as a receiver. The receiver is configured to perform the receiving step in the embodiments of this application. A component configured to implement a sending function in the transceiver 803 may be considered as a transmitter. The transmitter is configured to perform the sending step in the embodiments of this application.

Based on the first possible implementation, the schematic structural diagram shown in FIG. 8 may be used to show a structure of the sending terminal or the receiving terminal in the foregoing embodiments.

When the schematic structural diagram shown in FIG. 8 is used to show the structure of the sending terminal in the foregoing embodiment, the processor 801 is configured to control and manage an action of the sending terminal. For example, the processor 801 is configured to support the sending terminal in performing 501 and 503 in FIG. 5, and/or an action performed by the sending terminal in another process described in the embodiments of this application. The processor 801 may communicate with another network entity by using the transceiver 803, for example, communicate with the receiving terminal shown in FIG. 5. The memory 802 is configured to store program code and data of the sending terminal.

When the schematic structural diagram shown in FIG. 8 is used to show the structure of the receiving terminal in the foregoing embodiment, the processor 801 is configured to control and manage an action of the receiving terminal. For example, the processor 801 is configured to support the receiving terminal in performing 501 to 503 in FIG. 5, and/or an action performed by the receiving terminal in another process described in the embodiments of this application. The processor 801 may communicate with another network entity by using the transceiver 803, for example, communicate with the sending terminal shown in FIG. 5. The memory 802 is configured to store program code and data of the receiving terminal.

In a second possible implementation, the processor 801 includes a logic circuit and an input interface and/or an output interface. The output interface is configured to perform a sending action in a corresponding method, and the input interface is configured to perform a receiving action in a corresponding method.

Based on the second possible implementation, referring to FIG. 9, the schematic structural diagram shown in FIG. 9 may be used to show a structure of the sending terminal or the receiving terminal in the foregoing embodiments.

When the schematic structural diagram shown in FIG. 9 is used to show the structure of the sending terminal in the foregoing embodiment, the processor 801 is configured to control and manage an action of the sending terminal. For example, the processor 801 is configured to support the sending terminal in performing 501 and 503 in FIG. 5, and/or an action performed by the sending terminal in another process described in the embodiments of this application. The processor 801 may communicate with another network entity by using an input interface and/or an output interface, for example, communicate with the receiving terminal shown in FIG. 5. The memory 802 is configured to store program code and data of the sending terminal.

When the schematic structural diagram shown in FIG. 9 is used to show the structure of the receiving terminal in the foregoing embodiment, the processor 801 is configured to control and manage an action of the receiving terminal. For example, the processor 801 is configured to support the receiving terminal in performing 501 to 503 in FIG. 5, and/or an action performed by the receiving terminal in another process described in the embodiments of this application. The processor 801 may communicate with another network entity by using an input interface and/or an output interface, for example, communicate with the sending terminal shown in FIG. 5. The memory 802 is configured to store program code and data of the receiving terminal.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communications system, including the foregoing sending terminal and the foregoing receiving terminal. Optionally, the communications system further includes the foregoing terminal.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the process or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, persons skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

With reference to the foregoing description, this application further provides the following embodiments:

Embodiment 1: A communications method, where the method includes:

A receiving terminal receives X physical sidelink shared channels PSSCHs from at least one sending terminal, where one PSSCH corresponds to one physical sidelink feedback channel PSFCH resource, X PSFCH resources corresponding to the X PSSCHs have a same time domain resource, and X is an integer greater than 1;

the receiving terminal determines M PSFCH resources based on priorities of the X PSFCH resources, transmit power corresponding to the X PSFCH resources, and total transmit power of the receiving terminal, where M is less than or equal to M', M' is an upper limit of a quantity of PSFCH resources occupied on the same time domain resource; and the receiving terminal sends feedback information to some or all of the at least one sending terminal on the M PSFCH resources.

Embodiment 2: According to the method in Embodiment 1, that the receiving terminal determines M PSFCH resources based on priorities of the X PSFCH resources, transmit power corresponding to the X PSFCH resources, and total transmit power of the receiving terminal includes:

The receiving terminal accumulates, in descending order of the priorities of the X PSFCH resources, the transmit power corresponding to the PSFCH resources;

when an accumulation result of accumulating transmit power corresponding to m PSFCH resources is less than or equal to the total transmit power, and m is equal to M', or when an accumulation result of accumulating transmit power corresponding to m PSFCH resources is equal to the total transmit power, and m is less than M', the receiving terminal determines that the m PSFCH resources are the M PSFCH resources.

Embodiment 3: According to the method in Embodiment 1, that the receiving terminal determines M PSFCH resources based on priorities of the X PSFCH resources, transmit power corresponding to the X PSFCH resources, and total transmit power of the receiving terminal includes:

The receiving terminal accumulates, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal determines that the m PSFCH resources are the M PSFCH resources.

Embodiment 4: According to the method in Embodiment 1, that the receiving terminal determines M PSFCH resources based on priorities of the X PSFCH resources, transmit power corresponding to the X PSFCH resources, and total transmit power of the receiving terminal includes:

The receiving terminal accumulates, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal reduces transmit power corresponding to an $(m+1)^{th}$ PSFCH resource in the m+1 PSFCH resources, so that the accumulation result of accumulating the transmit power corresponding to the m+1 PSFCH resources is less than or equal to the total transmit power; and the receiving terminal determines that the m+1 PSFCH resources are the M PSFCH resources.

Embodiment 5: According to the method in Embodiment 1, that the receiving terminal determines M PSFCH resources based on priorities of the X PSFCH resources, transmit power corresponding to the X PSFCH resources, and total transmit power of the receiving terminal includes:

The receiving terminal accumulates, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal reduces transmit power corresponding to a PSFCH resource with a first priority in the m+1 PSFCH resources, so that the accumulation result of accumulating the transmit power corresponding to the m+1 PSFCH resources is less than or equal to the total transmit power, where the first priority is a priority of an $(m+1)^{th}$ PSFCH resource in the m+1 PSFCH resources; and the receiving terminal determines that the m+1 PSFCH resources are the M PSFCH resources.

Embodiment 6: According to the method in Embodiment 1, that the receiving terminal determines M PSFCH resources based on priorities of the X PSFCH resources, transmit power corresponding to the X PSFCH resources, and total transmit power of the receiving terminal includes:

The receiving terminal accumulates, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving terminal reduces transmit power corresponding to x1 PSFCH resources with a first priority, so that an accumulation result of accumulating transmit power corresponding to m+1−x2+x1 PSFCH resources is less than or equal to the total transmit power, where the first priority is a priority of an $(m+1)^{th}$ PSFCH resource in the m+1 PSFCH resources, x2 is a quantity of PSFCH resources with the first priority in the m+1 PSFCH resources, x1=min(x3, M'−(m+1−x2)), min is a minimum value function, and x3 is a quantity of PSFCH resources with the first priority; and the receiving terminal determines that the m+1−x2+x1 PSFCH resources are the M PSFCH resources.

Embodiment 7: According to the method in Embodiment 1, that the receiving terminal determines M PSFCH resources based on priorities of the X PSFCH resources, transmit power corresponding to the X PSFCH resources, and total transmit power of the receiving terminal includes:

The receiving terminal accumulates, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', the receiving determines a first combination from a plurality of combinations, where the plurality of combinations are combinations of PSFCH resources with a first priority, and the first priority is a priority of an $(m+1)^{th}$ PSFCH resource in the m+1 PSFCH resources; and the receiving terminal determines that m+1−x2+x3 accumulated PSFCH resources are the M PSFCH resources, where x2 is a quantity of PSFCH resources with the first priority in the m+1 PSFCH resources, and x3 is a quantity of PSFCH resources in the first combination, where compared with another combination, the first combination meets the following features: a sum of the quantity of PSFCH resources in the first combination and a quantity of all PSFCH resources with priorities higher than the first priority is less than or equal to M', a sum of transmit power corresponding to the PSFCH resources in the first combination and transmit power corresponding to all the PSFCH resources with the priorities higher than the first priority is less than or equal to the total transmit power, and the sum of the quantity of PSFCH resources in the first combination and the quantity of all PSFCH resources with the priorities higher than the first priority is a maximum.

Embodiment 8: According to the method in Embodiment 7, compared with the another combination, the first combination further meets the following feature: The sum of the transmit power corresponding to the PSFCH resources in the first combination and the transmit power corresponding to all the PSFCH resources with the priorities higher than the first priority is a minimum, or a difference between the total transmit power and the sum of the transmit power corresponding to the PSFCH resources in the first combination and the transmit power corresponding to all the PSFCH resources with the priorities higher than the first priority is a maximum.

Embodiment 9: A communications apparatus, where the communications apparatus includes a communications unit and a processing unit.

The communications unit is configured to receive X physical sidelink shared channels PSSCHs from at least one sending terminal, where one PSSCH corresponds to one physical sidelink feedback channel PSFCH resource, X PSFCH resources corresponding to the X PSSCHs have a same time domain resource, and x is an integer greater than 1.

The processing unit is configured to determine M PSFCH resources based on priorities of the X PSFCH resources, transmit power corresponding to the X PSFCH resources, and total transmit power of the apparatus, where M is less than or equal to M', and M' is an upper limit of a quantity of PSFCH resources occupied on the same time domain resource.

The communications unit is further configured to send feedback information to some or all of the at least one sending terminal on the M PSFCH resources.

Embodiment 10: According to the apparatus in Embodiment 9, the processing unit is specifically configured to:

accumulate, in descending order of the priorities of the X PSFCH resources, the transmit power corresponding to the PSFCH resources;

when an accumulation result of accumulating transmit power corresponding to m PSFCH resources is less than or equal to the total transmit power, and m is equal to M', or when an accumulation result of accumulating transmit power corresponding to m PSFCH resources is equal to the total transmit power, and m is less than M', determine that the m PSFCH resources are the M PSFCH resources.

Embodiment 11: According to the apparatus in Embodiment 9, the processing unit is specifically configured to:

accumulate, in descending order of the priorities of the X PSFCH resources, the transmit power corresponding to the PSFCH resources;

when an accumulation result of accumulating transmit power corresponding to m PSFCH resources is less than or equal to the total transmit power, and when an accumulation result of accumulating transmit power corresponding to m+1 PSFCH resources is greater than the total transmit power, and m+1 is less than or equal to M', determine that the m PSFCH resources are the M PSFCH resources.

Embodiment 12: According to the apparatus in Embodiment 9, the processing unit is specifically configured to:

accumulate, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', reduce transmit power corresponding to an $(m+1)^{th}$ PSFCH resource in the m+1 PSFCH resources, so that the accumulation result of accumulating the transmit power corresponding to the m+1 PSFCH resources is less than or equal to the total transmit power; and determine that the m+1 PSFCH resources are the M PSFCH resources.

Embodiment 13: According to the apparatus in Embodiment 9, the processing unit is specifically configured to:

accumulate, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', reduce transmit power corresponding to a PSFCH resource with a first priority in the m+1 PSFCH resources, so that the accumulation result of accumulating the transmit power corresponding to the m+1 PSFCH resources is less than or equal to the total transmit power, where the first priority is a priority of an $(m+1)^{th}$ PSFCH resource in the m+1 PSFCH resources; and determine that the m+1 PSFCH resources are the M PSFCH resources.

Embodiment 14: According to the apparatus in Embodiment 9, the processing unit is specifically configured to:

accumulate, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', reduce transmit power corresponding to x1 PSFCH resources with a first priority, so that an accumulation result of accumulating transmit power corresponding to m+1−x2+x1 PSFCH resources is less than or equal to the total transmit power, where the first priority is a priority of an $(m+1)^{th}$ PSFCH resource in the m+1 PSFCH resources, x2 is a quantity of PSFCH resources with the first priority in the m+1 PSFCH resources, x1=min(x3, M'−(m+1−x2)), min is a minimum value function, and x3 is a quantity of PSFCH resources with the first priority; and determine that the m+1−x2+x1 PSFCH resources are the M PSFCH resources.

Embodiment 15: According to the apparatus in Embodiment 9, the processing unit is specifically configured to:

accumulate, in descending order of the priorities of the X PSFCH resources, the transmit power corresponding to the PSFCH resources;

when an accumulation result of accumulating transmit power corresponding to m PSFCH resources is less than or equal to the total transmit power, an accumulation result of accumulating transmit power corresponding to m+1 PSFCH resources is greater than the total transmit power, and m+1 is less than or equal to M', determine a first combination from a plurality of combinations, where the plurality of combinations are combinations of PSFCH resources with a first priority, and the first priority is a priority of an $(m+1)^{th}$ PSFCH resource in the m+1 PSFCH resources; and determine that m+1−x2+x3 accumulated PSFCH resources are the M PSFCH resources, where x2 is a quantity of PSFCH resources with the first priority in the m+1 PSFCH resources, and x3 is a quantity of PSFCH resources in the first combination, where compared with another combination, the first combination meets the following features: a sum of the quantity of PSFCH resources in the first combination and a quantity of all PSFCH resources with priorities higher than the first priority is less than or equal to M', a sum of transmit power corresponding to the PSFCH resources in the first combination and transmit power corresponding to all the PSFCH resources with the priorities higher than the first priority is less than or equal to the total transmit power, and the sum of the quantity of PSFCH resources in the first combination and the quantity of all PSFCH resources with the priorities higher than the first priority is a maximum.

Embodiment 16: According to the apparatus in Embodiment 15, compared with the another combination, the first combination further meets the following feature: The sum of the transmit power corresponding to the PSFCH resources in the first combination and the transmit power corresponding to all the PSFCH resources with the priorities higher than the first priority is a minimum, or a difference between the total transmit power and the sum of the transmit power corresponding to the PSFCH resources in the first combination and the transmit power corresponding to all the PSFCH resources with the priorities higher than the first priority is a maximum.

Embodiment 17: A communications apparatus, where the communications apparatus includes a processor.

The processor is connected to a memory, the memory is configured to store computer-executable instructions, and the processor executes the computer-executable instructions stored in the memory, so that the apparatus implements the method according to any one of Embodiments 1 to 8.

Embodiment 18: A computer-readable storage medium, including instructions, where when the instructions are run on a computer, the computer is enabled to perform the method according to any one of Embodiments 1 to 8.

Embodiment 19: A computer program product includes instructions, and when the instructions are run on a computer, the computer is enabled to perform the method according to any one of Embodiments 1 to 8.

Embodiment 20: A chip includes instructions, and when the instructions are run on a computer, the computer is enabled to perform the method according to any one of Embodiments 1 to 8.

What is claimed is:

1. A communications method, comprising:
receiving, by a communications apparatus, X physical sidelink shared channels (PSSCHs), wherein each one of the PSSCHs corresponds to one respective physical sidelink feedback channel (PSFCH) resource, X PSFCH resources corresponding to the X PSSCHs have a same time domain resource, and X is an integer greater than 1;
determining, by the communications apparatus, M PSFCH resources based on priorities of the X PSFCH resources, transmit powers corresponding to the X PSFCH resources, and a total transmit power of the communications apparatus, wherein M is less than or equal to M', and M' is an upper limit of a quantity of PSFCH resources occupied on a first time domain resource;
wherein the M PSFCH resources are determined according to an accumulation result, the accumulation result is obtained by the communications apparatus by accumulating the transmit powers corresponding to the PSFCH resources in descending order of the priorities of the X PSFCH resources; and
sending, by the communications apparatus, feedback information to some or all of the at least one sending terminal on the M PSFCH resources.

2. The method according to claim 1, wherein the determining, by the communications apparatus, M PSFCH resources based on priorities of the X PSFCH resources, the transmit powers corresponding to the X PSFCH resources, and the total transmit power of the communications apparatus comprises:
accumulating, by the communications apparatus in descending order of the priorities of the X PSFCH resources, the transmit powers corresponding to each of the PSFCH resources; and
when an accumulation result of accumulating the transmit powers corresponding to m PSFCH resources is less than or equal to the total transmit power, and m is equal to M'; or when an accumulation result of accumulating the transmit powers corresponding to m PSFCH resources is equal to the total transmit power, and m is less than M',
determining, by the communications apparatus, that the m PSFCH resources are the M PSFCH resources.

3. The method according to claim 1, wherein the determining, by the communications apparatus, M PSFCH resources based on priorities of the X PSFCH resources, the transmit powers corresponding to each of the X PSFCH resources, and the total transmit power of the communications apparatus comprises:
accumulating, by the communications apparatus in descending order of the priorities of the X PSFCH resources, the transmit powers corresponding to the PSFCH resources; and
when an accumulation result of accumulating the transmit powers corresponding to m PSFCH resources is less than or equal to the total transmit power, and an accumulation result of accumulating the transmit powers corresponding to m+1 PSFCH resources is greater than the total transmit power, determining, by the communications apparatus, that the m PSFCH resources are the M PSFCH resources.

4. The method according to claim 1, wherein the determining, by the communications apparatus, M PSFCH resources based on priorities of the X PSFCH resources, the transmit powers corresponding to each of the X PSFCH resources, and the total transmit power of the communications apparatus comprises:
accumulating, by the communications apparatus in descending order of the priorities of the X PSFCH resources, the transmit powers corresponding to the PSFCH resources;
when an accumulation result of accumulating the transmit powers corresponding to m PSFCH resources is less than or equal to the total transmit power, an accumulation result of accumulating transmit powers corresponding to m+1 PSFCH resources is greater than the total transmit power, and m+1 is less than or equal to M', reducing, by the communications apparatus, transmit power corresponding to an $(m+1)^{th}$ PSFCH resource in the m+1 PSFCH resources, so that the result of accumulating the transmit powers corresponding to the m+1 PSFCH resources is less than or equal to the total transmit power; and
determining, by the communications apparatus, that the m+1 PSFCH resources are the M PSFCH resources.

5. The method according to claim 1, wherein the determining, by the communications apparatus, M PSFCH resources based on priorities of the X PSFCH resources, the transmit powers corresponding to the X PSFCH resources, and the total transmit power of the communications apparatus comprises:
accumulating, by the communications apparatus in descending order of the priorities of the X PSFCH resources, the transmit powers corresponding to the PSFCH resources;
when an accumulation result of accumulating transmit powers corresponding to m PSFCH resources is less than or equal to the total transmit power, an accumulation result of accumulating transmit powers corresponding to m+1 PSFCH resources is greater than the total transmit power, and m+1 is less than or equal to M', reducing, by the communications apparatus, transmit power corresponding to a PSFCH resource with a first priority in the m+1 PSFCH resources, so that the result of accumulating the transmit power corresponding to the m+1 PSFCH resources is less than or equal to the total transmit power, wherein the first priority is a priority of an $(m+1)^{th}$ PSFCH resource in the m+1 PSFCH resources; and
determining, by the communications apparatus, that the m+1 PSFCH resources are the M PSFCH resources.

6. The method according to claim 1, wherein the determining, by the communications apparatus, M PSFCH resources based on priorities of the X PSFCH resources, the transmit powers corresponding to each of the X PSFCH resources, and the total transmit power of the communications apparatus comprises:
accumulating, by the communications apparatus in descending order of the priorities of the X PSFCH resources, the transmit powers corresponding to the PSFCH resources;
when an accumulation result of accumulating transmit powers corresponding to m PSFCH resources is less than or equal to the total transmit power, an accumulation result of accumulating transmit powers corresponding to m+1 PSFCH resources is greater than the total transmit power, and m+1 is less than or equal to M', reducing, by the communications apparatus, transmit power corresponding to x1 PSFCH resources with a first priority, so that an accumulation result of accumulating transmit powers corresponding to m+1−x2+ x1 PSFCH resources is less than or equal to the total transmit power, wherein the first priority is a priority of an $(m+1)^{th}$ PSFCH resource in the m+1 PSFCH resources, x2 is a quantity of PSFCH resources with the first priority in the m+1 PSFCH resources, x1=min(x3, M'−(m+1−x2)), min is a minimum value function, and x3 is a quantity of PSFCH resources with the first priority; and determining, by the communications apparatus, that the m+1−x2+x1 PSFCH resources are the M PSFCH resources.

7. The method according to claim 1, wherein the determining, by the communications apparatus, M PSFCH resources based on priorities of the X PSFCH resources, the_transmit powers corresponding to the X PSFCH resources, and the total transmit power of the communications apparatus comprises:

accumulating, by the communications apparatus in descending order of the priorities of the X PSFCH resources, the transmit powers corresponding to the PSFCH resources;

when an accumulation result of accumulating the transmit powers corresponding to m PSFCH resources is less than or equal to the total transmit power, an accumulation result of accumulating the transmit powers corresponding to m+1 PSFCH resources is greater than the total transmit power, and m+1 is less than or equal to M', determining, by the communications apparatus, a first combination from a plurality of combinations, wherein the plurality of combinations are combinations of PSFCH resources with a first priority, and the first priority is a priority of an $(m+1)^{th}$ PSFCH resource in the m+1 PSFCH resources; and determining, by the communications apparatus, that m+1−x2+x3 accumulated PSFCH resources are the M PSFCH resources, wherein x2 is a quantity of PSFCH resources with the first priority in the m+1 PSFCH resources, and x3 is a quantity of PSFCH resources in the first combination, wherein compared with another combination, the first combination meets the following features: a sum of the quantity of PSFCH resources in the first combination and a quantity of all PSFCH resources with priorities higher than the first priority is less than or equal to M', a sum of transmit powers corresponding to the PSFCH resources in the first combination and transmit powers corresponding to all the PSFCH resources with the priorities higher than the first priority is less than or equal to the total transmit power, and the sum of the quantity of PSFCH resources in the first combination and the quantity of all PSFCH resources with the priorities higher than the first priority is a maximum.

8. The method according to claim 7, wherein compared with the another combination, the first combination further meets the following feature: the sum of the transmit powers corresponding to each of the PSFCH resources in the first combination and the transmit powers corresponding to all the PSFCH resources with the priorities higher than the first priority is a minimum, or a difference between the total transmit power and the sum of the transmit power corresponding to the PSFCH resources in the first combination and the transmit power corresponding to all the PSFCH resources with the priorities higher than the first priority is a maximum.

9. The method according to claim 1, wherein M is greater than or equal to $$\sum_{i=1}^{n-1} l_i,$$

n−1 is a maximum value of q which satisfies the following formula:

$$\sum_{j=1}^{\sum_{i=1}^{q} l_i} P_j \le P_{max};$$

wherein the X PSFCH resources are classified into L priorities according to a priority rule, a quantity of PSFCH resources with an $i^{th}$ priority in the L priorities is denoted as li, $P_j$ represents transmit power corresponding to the $j^{th}$ PSFCH resource sorted in descending order of the priorities of the X PSFCH resources, j is an integer greater than 0, and q represents the $q^{th}$ priority, and $P_{max}$ represents the total transmit power.

10. A communications apparatus, comprising a communications unit and a processing unit, wherein the communications unit is configured to receive X physical sidelink shared channels (PSSCHs), wherein each one of the PSSCHs corresponds to one respective physical sidelink feedback channel (PSFCH) resource, X PSFCH resources corresponding to the X PSSCHs have a same first time domain resource, and X is an integer greater than 1;

the processing unit is configured to determine M PSFCH resources based on priorities of the X PSFCH resources, transmit powers corresponding to the X PSFCH resources, and a total transmit power of the communications apparatus, wherein M is less than or equal to M', and M' is an upper limit of a quantity of PSFCH resources occupied on a first time domain resource;

wherein the M PSFCH resources are determined according to an accumulation result, the accumulation result is obtained by the processing unit by accumulating the transmit powers corresponding to the PSFCH resources in descending order of the priorities of the X PSFCH resources; and the communications unit is further configured to send feedback information on the M PSFCH resources.

11. The apparatus according to claim 10, wherein the processing unit is specifically configured to:

accumulate, in descending order of the priorities of the X PSFCH resources, the transmit powers corresponding to each of the PSFCH resources; and when an accumulation result of accumulating the transmit powers corresponding to m PSFCH resources is less than or equal to the total transmit power, and m is equal to M'; or when an accumulation result of accumulating the transmit powers corresponding to m PSFCH resources is equal to the total transmit power, and m is less than M'; determine that the m PSFCH resources are the M PSFCH resources.

12. The communications apparatus according to claim 10, wherein the processing unit is configured to:

accumulate, in descending order of the priorities of the X PSFCH resources, the transmit powers corresponding to the PSFCH resources; and when an accumulation result of accumulating the transmit powers corresponding to m PSFCH resources is less than or equal to the total transmit power, an accumulation result of accumulating the transmit powers corresponding to m+1 PSFCH resources is greater than the total transmit power, and m+1 is less than or equal to M', determine that the m PSFCH resources are the M PSFCH resources.

13. The communications apparatus according to claim 10, wherein the processing unit is configured to:
   accumulate, in descending order of the priorities of the X PSFCH resources, the transmit powers corresponding to the PSFCH resources;
   when an accumulation result of accumulating the transmit powers corresponding to m PSFCH resources is less than or equal to the total transmit power, an accumulation result of accumulating transmit powers corresponding to m+1 PSFCH resources is greater than the total transmit power, and m+1 is less than or equal to M', reduce transmit power corresponding to an $(m+1)^{th}$ PSFCH resource in the m+1 PSFCH resources, so that the accumulation result of accumulating the transmit power corresponding to the m+1 PSFCH resources is less than or equal to the total transmit power; and
   determine that the m+1 PSFCH resources are the M PSFCH resources.

14. The communications apparatus according to claim 10, wherein the processing unit is configured to:
   accumulate, in descending order of the priorities of the X PSFCH resources, the transmit powers corresponding to the PSFCH resources;
   when an accumulation result of accumulating transmit powers corresponding to m PSFCH resources is less than or equal to the total transmit power, an accumulation result of accumulating transmit power corresponding to m+1 PSFCH resources is greater than the total transmit power, and m+1 is less than or equal to M', reduce transmit power corresponding to a PSFCH resource with a first priority in the m+1 PSFCH resources, so that the result of accumulating the transmit power corresponding to the m+1 PSFCH resources is less than or equal to the total transmit power, wherein the first priority is a priority of an $(m+1)^{th}$ PSFCH resource in the m+1 PSFCH resources; and
   determine that the m+1 PSFCH resources are the M PSFCH resources.

15. The communications apparatus according to claim 10, wherein the processing unit is configured to:
   accumulate, in descending order of the priorities of the X PSFCH resources, the transmit powers corresponding to the PSFCH resources;
   when an accumulation result of accumulating transmit powers corresponding to m PSFCH resources is less than or equal to the total transmit power, an accumulation result of accumulating transmit powers corresponding to m+1 PSFCH resources is greater than the total transmit power, and m+1 is less than or equal to M', reduce transmit power corresponding to x1 PSFCH resources with a first priority, so that an accumulation result of accumulating transmit power corresponding to m+1−x2+x1 PSFCH resources is less than or equal to the total transmit power, wherein the first priority is a priority of an $(m+1)^{th}$ PSFCH resource in the m+1 PSFCH resources, x2 is a quantity of PSFCH resources with the first priority in the m+1 PSFCH resources, x1=min (x3, M'−(m+1−x2)), min is a minimum value function, and x3 is a quantity of PSFCH resources with the first priority; and
   determine that the m+1−x2+x1 PSFCH resources are the M PSFCH resources.

16. The communications apparatus according to claim 10, wherein the processing unit is specifically configured to:
   accumulate, in descending order of the priorities of the X PSFCH resources, the transmit powers corresponding to the PSFCH resources;
   when an accumulation result of accumulating the transmit powers corresponding to m PSFCH resources is less than or equal to the total transmit power, an accumulation result of accumulating transmit powers corresponding to m+1 PSFCH resources is greater than the total transmit power, and m+1 is less than or equal to M', determine a first combination from a plurality of combinations, wherein the plurality of combinations are combinations of PSFCH resources with a first priority, and the first priority is a priority of an $(m+1)^{th}$ PSFCH resource in the m+1 PSFCH resources; and
   determine that m+1−x2+x3 accumulated PSFCH resources are the M PSFCH resources, wherein x2 is a quantity of PSFCH resources with the first priority in the m+1 PSFCH resources, and x3 is a quantity of PSFCH resources in the first combination, wherein compared with another combination, the first combination meets the following features: a sum of the quantity of PSFCH resources in the first combination and a quantity of all PSFCH resources with priorities higher than the first priority is less than or equal to M', a sum of the transmit powers corresponding to the PSFCH resources in the first combination and transmit power corresponding to all the PSFCH resources with the priorities higher than the first priority is less than or equal to the total transmit power, and the sum of the quantity of PSFCH resources in the first combination and the quantity of all PSFCH resources with the priorities higher than the first priority is a maximum.

17. The communications apparatus according to claim 16, wherein compared with the another combination, the first combination further meets the following feature: the sum of the transmit powers corresponding to the PSFCH resources in the first combination and the transmit powers corresponding to all the PSFCH resources with the priorities higher than the first priority is a minimum, or a difference between the total transmit power and the sum of the transmit power corresponding to the PSFCH resources in the first combination and the transmit power corresponding to all the PSFCH resources with the priorities higher than the first priority is a maximum.

18. The communications apparatus according to claim 10, wherein M is greater than or equal to $$\sum_{i=1}^{n-1} li,$$

n−1 is a maximum value of q which satisfies the following formula:

$$\sum_{j=1}^{\sum_{i=1}^{q} li} P_j \le P_{max};$$

wherein the X PSFCH resources are classified into L priorities according to a priority rule, a quantity of PSFCH resources with an $i^{th}$ priority in the L priorities is denoted as li, $P_j$ represents transmit power corresponding to the $j^{th}$ PSFCH resource sorted in descending order of the priorities of the X PSFCH resources, j is an integer greater than 0, and q represents the $q^{th}$ priority, and $P_{max}$ represents the total transmit power.

* * * * *